(12) United States Patent
Priness et al.

(10) Patent No.: US 10,185,973 B2
(45) Date of Patent: Jan. 22, 2019

(54) INFERRING VENUE VISITS USING SEMANTIC INFORMATION

(71) Applicant: Microsoft Technology Licensing, LLC, Redmond, WA (US)

(72) Inventors: Ido Priness, Herzliya (IL); Haim Somech, Ramat Gan (IL); Adi L. Miller, Ramat Hasharon (IL); Michael Sterenberg, Kfar Saba (IL); Oded Vainas, Petach Tigwa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 14/680,762

(22) Filed: Apr. 7, 2015

(65) Prior Publication Data
US 2016/0300263 A1    Oct. 13, 2016

(51) Int. Cl.
G06Q 30/02    (2012.01)
H04W 4/02    (2018.01)

(52) U.S. Cl.
CPC ..... *G06Q 30/0255* (2013.01); *G06Q 30/0261* (2013.01); *G06Q 30/0267* (2013.01); *H04W 4/02* (2013.01)

(58) Field of Classification Search
None
See application file for complete search history.

(56) References Cited

U.S. PATENT DOCUMENTS

| 6,989,753 B1 | 1/2006 | Lamming et al. |
| 7,366,548 B2 | 4/2008 | Del Signore |
| 7,856,360 B2 | 12/2010 | Kramer et al. |

(Continued)

FOREIGN PATENT DOCUMENTS

| EP | 2284574 A2 | 2/2011 |
| EP | 2420964 A2 | 2/2012 |

(Continued)

OTHER PUBLICATIONS

"Discovering and Predicting User Routines by Differential Analysis of Social Network Traces"—2013 (authored by Fabio Pianese, Xueli An, Fahim Kawsar, and Hiroki Ishizuka).*

(Continued)

*Primary Examiner* — James M Detweiler
(74) *Attorney, Agent, or Firm* — Shook, Hardy & Bacon, L.L.P.

(57) ABSTRACT

A method for inferring venue visits using semantic information includes receiving sensor data from sensors. An indication of a location is received that is associated with a user and determined based on the sensor data. A set of candidate venues associated with the location is determined based on the indication of the location. Sets of semantic information associated with the set of candidate venues are determined based on the sensor data. Candidate venues of the set are ranked by confidence that a given candidate venue corresponds to a visited venue of a venue visit based on the set of semantic information associated with the given candidate venue and additional semantic information associated with the user. A highest ranked candidate venue is selected as the visited venue and an indication is provided to a service causing content to be presented to the user based on the selected visited venue.

19 Claims, 6 Drawing Sheets

(56) References Cited

U.S. PATENT DOCUMENTS

| | | | |
|---|---|---|---|
| 7,895,277 | B2 | 2/2011 | Drory et al. |
| 7,996,338 | B2 | 8/2011 | Kamar et al. |
| 8,275,649 | B2 | 9/2012 | Zheng et al. |
| 8,335,494 | B2 | 12/2012 | Wilkerson |
| 8,352,561 | B1 | 1/2013 | Denise |
| 8,457,608 | B2 | 6/2013 | Wilkerson |
| 8,483,665 | B2 | 7/2013 | Kissinger et al. |
| 8,520,814 | B2 | 8/2013 | Jiang et al. |
| 8,558,703 | B2 | 10/2013 | Edlund et al. |
| 8,565,731 | B2 | 10/2013 | Lynch |
| 8,594,641 | B2 | 11/2013 | Neilsen |
| 8,661,087 | B2 | 2/2014 | Denise |
| 8,676,167 | B2 | 3/2014 | Ferro |
| 8,719,198 | B2 | 5/2014 | Zheng et al. |
| 8,775,351 | B2 | 7/2014 | Moore et al. |
| 8,798,249 | B2 | 8/2014 | Kalpathy Narayanan |
| 8,862,676 | B1 | 10/2014 | Bilinski et al. |
| 8,866,607 | B2 | 10/2014 | Velusamy |
| 9,274,687 | B1 | 3/2016 | Meschkat |
| 2001/0029194 | A1 | 10/2001 | Ketola et al. |
| 2003/0212646 | A1 | 11/2003 | Horvitz |
| 2004/0194110 | A1 | 9/2004 | McKee et al. |
| 2006/0240803 | A1 | 10/2006 | Valeriano et al. |
| 2007/0071209 | A1 | 3/2007 | Horvitz et al. |
| 2007/0208498 | A1 | 9/2007 | Barker et al. |
| 2007/0214228 | A1 | 9/2007 | Horvitz et al. |
| 2008/0004926 | A1 | 1/2008 | Horvitz et al. |
| 2009/0005987 | A1* | 1/2009 | Vengroff ............... G06Q 30/02 701/300 |
| 2009/0187467 | A1 | 7/2009 | Fang et al. |
| 2009/0245483 | A1 | 10/2009 | Shibuya et al. |
| 2009/0305744 | A1 | 12/2009 | Ullrich |
| 2011/0076989 | A1 | 3/2011 | Lynch |
| 2011/0099047 | A1* | 4/2011 | Weiss ..................... G06Q 10/00 705/7.34 |
| 2011/0218992 | A1 | 9/2011 | Waldman et al. |
| 2011/0239158 | A1 | 9/2011 | Barraclough et al. |
| 2011/0270712 | A1 | 11/2011 | Wood et al. |
| 2012/0030227 | A1 | 2/2012 | Mital et al. |
| 2012/0176236 | A1 | 7/2012 | Kao et al. |
| 2012/0330722 | A1* | 12/2012 | Volpe ................ G06Q 30/0201 705/7.32 |
| 2013/0043998 | A1 | 2/2013 | Edlund et al. |
| 2013/0078958 | A1 | 3/2013 | Kyprianou |
| 2013/0165185 | A1 | 6/2013 | Guo et al. |
| 2013/0226857 | A1* | 8/2013 | Shim ........................ G06N 5/04 706/52 |
| 2013/0316313 | A1 | 11/2013 | Darrow |
| 2013/0324093 | A1 | 12/2013 | Santamaria et al. |
| 2013/0325855 | A1 | 12/2013 | Kapicioglu et al. |
| 2014/0032325 | A1 | 1/2014 | Weiss et al. |
| 2014/0032572 | A1* | 1/2014 | Eustice ................... H04W 4/21 707/748 |
| 2014/0067455 | A1 | 3/2014 | Zhang et al. |
| 2014/0082094 | A1 | 3/2014 | Bilgen et al. |
| 2014/0095281 | A1* | 4/2014 | Weiss ................ G06Q 30/0211 705/14.13 |
| 2014/0120961 | A1 | 5/2014 | Buck |
| 2014/0280657 | A1 | 9/2014 | Miller et al. |
| 2014/0295807 | A1 | 10/2014 | Li et al. |
| 2015/0118667 | A1* | 4/2015 | Andrew ............... G06Q 10/103 434/236 |
| 2015/0271645 | A1* | 9/2015 | Wyatt ................... H04W 4/029 455/456.2 |
| 2016/0091871 | A1 | 3/2016 | Marti et al. |
| 2016/0091872 | A1 | 3/2016 | Marti et al. |
| 2016/0232327 | A1 | 8/2016 | Windridge et al. |
| 2016/0295372 | A1* | 10/2016 | Kapicioglu ....... G06F 17/30241 |

FOREIGN PATENT DOCUMENTS

| | | |
|---|---|---|
| WO | 2011067675 A2 | 6/2011 |
| WO | 2012146831 A1 | 11/2012 |
| WO | 2014128021 A1 | 8/2014 |

OTHER PUBLICATIONS

International Search Report and Written Opinion Issued in PCT Application No. PCT/US2016/016247, dated May 4, 2016, 10 Pages.

Notice of Allowance dated Sep. 14, 2016 in U.S. Appl. No. 14/626,458, 14 pages.

Second Written Opinion Issued in PCT Application No. PCT/US2016/016247, dated Oct. 11, 2016, 6 Pages.

"International Preliminary Report on Patentability Issued in PCT Application No. PCT/US2015/063843", dated Sep. 16, 2016, 8 Pages.

"International Preliminary Report on Patentability Issued in PCT Application No. PCT/US2016/016249", dated Jan. 11, 2017, 10 Pages.

"Second Written Opinion Issued in PCT Application No. PCT/US2016/016249", dated Oct. 11, 2016, 9 Pages.

"Second Written Opinion Issued in PCT Application No. PCT/US2016/026484", dated Mar. 21, 2017, 7 Pages.

Non-Final Office Action dated Mar. 27, 2017 in U.S. Appl. No. 14/626,477, 21 pages.

Non-Final Office Action dated May 10, 2017 in U.S. Appl. No. 14/562,352, 28 pages.

"Second Written Opinion Issued in PCT Application No. PCT/US2015/063843", dated Jun. 13, 2016, 7 Pages.

International Search Report with Written Opinion dated May 4, 2016 in PCT Application No. PCT/US2016/016249, 12 pages.

"International Search Report and Written Opinion Issued in PCT Application No. PCT/US2016/026484", dated Jun. 27, 2016, 10 Pages.

Chon, et al., "Autonomous Place Naming System using Opportunistic Crowdsensing and Knowledge from Crowdsourcing", In Proceedings of the 12th International Conference on Information Processing in Sensor Networks, Apr. 8, 2013, pp. 19-30.

Elhamshary, et al., "CheckInside: A Fine-grained Indoor Location-based Social Network", In Proceedings of ACM International Joint Conference on Pervasive and Ubiquitous Computing, Sep. 13, 2014, pp. 607-618.

Chon, et al., "Automatically Characterizing Places with Opportunistic CrowdSensing using SmartPhone", In Proceedings of ACM Conference on Ubiquitous Computing, Sep. 5, 2012, 10 Pages.

Zheng, et al., "Collaborative Location and Activity Recommendations with GPS History Data", In Proceedings of 19th International Conference on World Wide Web, Apr. 26, 2010, 10 Pages.

Riboni, et al., "Differentially-Private Release of Check-in Data for Venue Recommendation", In Proceedings of IEEE International Conference on Pervasive Computing and Communications, Mar. 24, 2014, pp. 190-198.

Noulas, et al., "A Random Walk Around the City: New Venue Recommendation in Location-Based Social Networks", In Proceedings of IEEE International Conference on Social Computing, Privacy, Security, Risk and Trust, Sep. 3, 2012, pp. 144-153.

Khalid, et al., "OmniSuggest: A Ubiquitous Cloud-Based Context Aware Recommendation System for Mobile Social Networks", In Proceedings of IEEE Transactions on Services Computing, vol. 7, Issue 3, Dec. 3, 2013, pp. 401-414.

Vasconcelos, et al., "Tips, Dones and ToDos: Uncovering user Profiles in FourSquare", In Proceedings of Fifth ACM International Conference on Web Search and Data Mining, Feb. 8, 2012, 10 Pages.

Pianese, et al., "Discovering and Predicting User Routines by Differential Analysis of Social Network Traces", In IEEE 14th International Symposium and Workshops on a World of Wireless, Mobile and Multimedia Networks, Jun. 4, 2013, 10 pages.

"Routinely", Published on: Apr. 9, 2013 Available at: https://play.google.com/store/apps/details?id=com.braavos.apps.routinely&hl=en.

Knapen, et al., "Framework to Evaluate Rescheduling due to Unexpected Events in an Activity-Based Model", In TRB Annual Meeting, Nov. 14, 2012, 21 pages.

(56) References Cited

OTHER PUBLICATIONS

Carolis, et al., "Towards Learning Relations between User Daily Routines and Mood", In the 22nd Conference on User Modeling, Adaptation, and Personalization, Jul. 7, 2014, 8 pages.

Farrahi, et al., "What Did You Do Today? Discovering Daily Routines from Large-Scale Mobile Data", In Proceedings of the 16th ACM international conference on Multimedia, Oct. 26, 2008, 4 pages.

"ATracker—Daily Task and Time Tracking Lite", Published on: Apr. 3, 2014, 2 pages. Available at: https://itunes.apple.com/us/app/atracker-daily-task-time-tracking/id522008611?mt=8.

Missed Call Text Reminder, Retrieved on: Feb. 10, 2015, Available at: https://play.google.com/store/apps/details?id=com.hidtechs.alertme&hl=en.

Kazmucha, All Yson, "How to use Remind me Later to handle inopportune calls on your iPhone", Published on:Nov. 7, 2012, Available at: http://www.imore.com/how-remind-yourself-return-missed-call-your-iphone.

Dey, et al., "CybreMinder: A Context-Aware System for Supporting Reminders", In Proceedings of the 2nd International Symposium on Handheld and Ubiquitous computing, Sep. 25, 2000, 15 pages.

International Search Report and Written Opinion Issued in PCT Application No. PCT/US2015/063843, dated Mar. 17, 2016, 13 Pages.

Ex Parte Quayle Action dated Apr. 6, 2016 in U.S. Appl. No. 14/626,458, 4 pages.

Final Office Action dated Aug. 25, 2017 in U.S. Appl. No. 14/626,477, 25 pages.

Final Office Action dated Nov. 13, 2017 in U.S. Appl. No. 14/562,352, 31 pages.

Non-Final Office Action dated Jan. 3, 2018 in U.S. Appl. No. 15/397,493, 9 pages.

Final Office Action dated Jan. 29, 2018 in U.S. Appl. No. 14/680,762, 45 pages.

Non-Final Office Action dated Feb. 2, 2018 in U.S. Appl. No. 14/626,477, 26 pages.

Non-Final Office Action dated Feb. 22, 2018 in U.S. Appl. No. 14/562,352, 32 pages.

Notice of Allowance dated May 9, 2018 in U.S. Appl. No. 15/397,493, 7 pages.

\* cited by examiner

INFERRING VENUE VISITS USING SEMANTIC INFORMATION

BACKGROUND

With the prevalence of smartphones and smart devices, it has become increasingly practical to provide content to users while accounting for the location of the users. To this effect, positioning systems may employ a Global Positioning System (GPS) receiver on a mobile device, or Wi-Fi access point or GSM (Global System for Mobile communications) traces to aid in locating a user. However, positioning systems based on these technologies often cannot provide sufficient accuracy for determining specific venues visited by a person. For example, GPS-based positioning can be problematic where the GPS signal is compromised, such as inside buildings, and in so called "urban canyons" (downtown areas surrounded by skyscrapers). Moreover, in areas with a high density of venues, such as malls or downtown centers, it is difficult to pinpoint exact venues visited by a user. Thus, many approaches to detecting venues visited by users require an explicit selection of a venue by the user, which is sometimes referred to as a check-in.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present disclosure relate to inferring venue visits using semantic information. In various implementations, a system for inferring venue visits of users has access to semantic information that provides an understanding as to the likelihood that users have visited a particular venue. In various implementations, the visit may be ongoing or concluded. By supplementing location data of a user that is generated by a positioning system with the semantic information, the system can infer venue visits with a high degree of accuracy.

The semantic information can comprise characteristics of users and/or venues, which can inform the system as to the likelihood that a particular user has visited a particular venue in evaluating candidate venues as potential venues for the particular venue. In some cases, the system generates a set of candidate venues based on proximity between a determined location of the user and the candidate venues. The system optionally determines whether the user has visited any venue (e.g., regardless of the particular venue that is visited).

The system can rank the candidate venues by a likelihood that user has visited a particular candidate venue based on semantic information, such as at least one characteristic of the user and/or candidate venue. In some cases, the system generates an initial ranking of the candidate venues for a visit based on the semantic information. Subsequently, the candidate venues may be re-ranked at least once by optimizing candidate venue rankings across a sequence of venue visits. The re-ranking can also be based on semantic information available to the system that provides the system with an understanding of venue visitation patterns for the user and/or on the aggregate with respect to the venue visits in the sequence.

The ranked candidate venues can be used in various manners, such as to tailor the provision of content for the user. For example, the system can select the highest ranked candidate venue as a visited venue and can provide content to the user based on the visited venue. Users may receive assistance or otherwise receive tailored content that is relevant and helpful with respect to the visited venue. The tailored content may be provided while the venue visit is ongoing if the visited venue is determined during the visit. Further, the tailored content may be provided any time after the venue visit is concluded, especially where the visited venue is determined after the venue visit. These and other concepts are contemplated as being within the scope of the present disclosure.

BRIEF DESCRIPTION OF THE DRAWINGS

The present invention is described in detail below with reference to the attached drawing figures, wherein.

DETAILED DESCRIPTION

Figure 1:
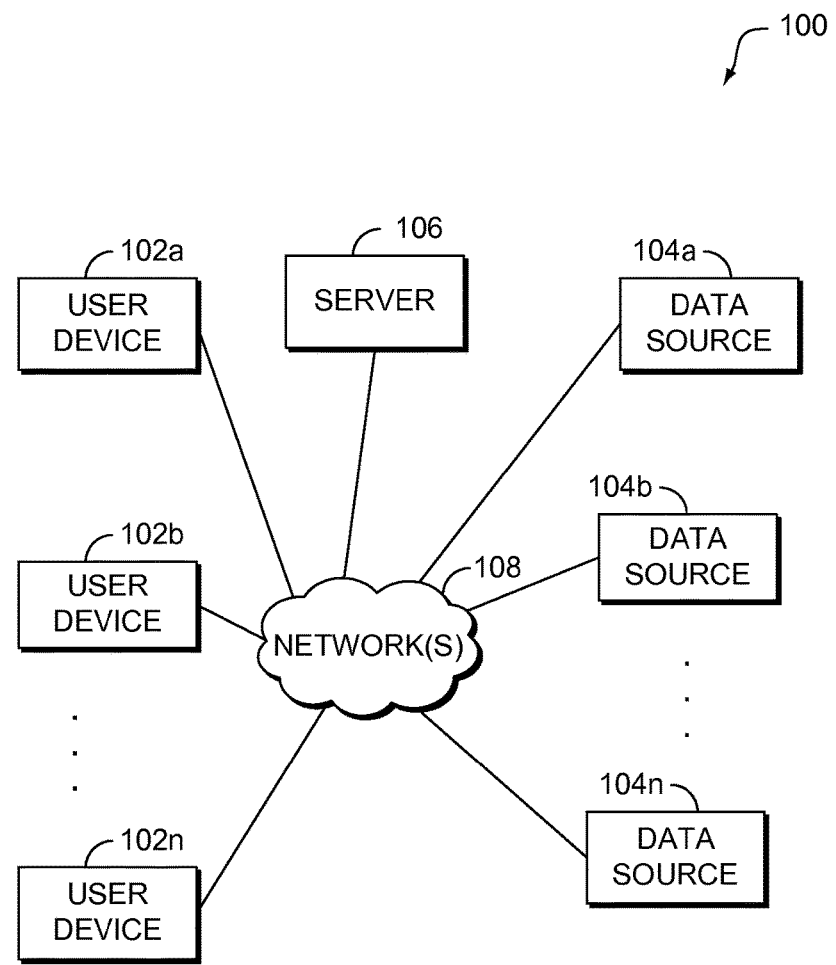
FIG. 1 is a block diagram showing a system for tailoring content to out of routine events in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to inferring venue visits using semantic information. A "venue" can be a location that people can conduct certain activities in person. Examples of a venue include, but are not limited to a particular: store, restaurant, theater, sport arena, factory, and office building. In various implementations, a system for inferring venue visits of users has access to semantic information that provides an understanding as to the likelihood that users have visited a particular venue. The visit may be ongoing or concluded when the visit is inferred. Positioning systems that employ a GPS receiver on a mobile device, or Wi-Fi access point or GSM traces to aid in locating a user can be inaccurate, particularly in areas with a high density of venues and poor signal strength. By supplementing location data of a user that is generated by these positioning systems with the semantic information, the system can infer venue visits with a high degree of accuracy.

The semantic information provides the system with an understanding of users and/or venues so that the system can adjust the likelihood that a user has visited a particular venue. In various implementations, the semantic information can be of the user for which a visit is being detected, one or more candidate venues being considered as a visited venue for the visit, and/or for one or more other users and/or venues. Where semantic information is of one or more other users or venues, the information employed may be aggregated from multiple users or venues, or may be with respect to one or more specific users or venues. For example, the semantic information may be of one or more users or venues the user is known by the system to be associated with (e.g., friends, family, colleagues, etc. of the user, which may be indicated in a user account).

The semantic information can comprise characteristics of users and/or venues, which can inform the system as to the likelihood that a particular user has visited a particular venue. The semantic information can comprise at least some explicit information, which may be explicit from a user, or explicit from a data source (e.g., a web page, document, file, etc.) from which the information is extracted. An example of explicit information comprises explicit characteristics of users or venues. However, in various implementations, the understanding of users and venues goes beyond explicit information, and can additionally or instead be inferred. An example of inferred information comprises inferred characteristics of users or venues.

In some respects, a routine characteristic corresponds to a characteristic of a venue or a user that is routine, common place, or regular for the venue or user. A sporadic characteristic can correspond to a characteristic of a venue or a user that is irregular, occasional, or isolated for a venue or a user. Whether a characteristic is a routine characteristic or a sporadic characteristic may depend on the perspective, understanding, and knowledge of the system. For example, routine characteristics and sporadic characteristic can both be types of inferred characteristics that are discovered by the system. A routine characteristic can be a characteristic that is determined by the system as being part of a routine that is detected and tracked by the system (e.g., venue visits, visitation patterns, and/or behavior patterns, or routines). A sporadic characteristic can be a characteristic that is determined by the system, but not as being part of a routine that is being detected and tracked by the system. However, in some cases, a sporadic characteristic may be inferred from multiple characteristics, which can include at least one routine characteristic.

Some examples of routine characteristics of a user include user preferences, such as cuisine preferences, brand preferences, movie preferences, music preferences, parental status (i.e., whether the user is a parent), demographic information (e.g., age, gender, marital status, the user being engaged to be married, the user being married, the user being single, literacy/education, employment status, occupation, residence location), routinely visited venues (e.g., user hubs), and many more. Examples of sporadic characteristics of a user include the user being sick, the user craving fast food, the user being late for work, the user diverging from or contradicting an expected tracked routine, the user being on vacation, specific personal events of the user, such as a wedding, and many more. Examples of routine characteristics of a venue include venue type or category (e.g., restaurant, retail, coffee shop, gym, movie theater, entertainment, work, office, etc.), cuisine served at the venue, operating hours, peak visit times to the venue, aggregate receipt totals for visitors at the venue, regular sales or other events at the venue (e.g., annual sales), aggregate visitor demographics, aggregate visitor characteristics, and many more. Examples of sporadic characteristics include a specific concert occurring at a particular day or time at the venue, an unexpected spike in visitors to the venue and/or visitors or traffic (e.g., people or vehicles) near the venue, weather conditions near the venue, unusual events or activity occurring at the venue, and many more.

In some implementations, the system determines a location of the user. The system may generate a set of candidate venues based on proximity between the determined location of the user and the candidate venues. The system may optionally determine whether the user has visited any venue (e.g., regardless of the particular venue that is visited). The determination can be based on the location of the user and the duration the user was at or near the location. This can include using cluster analysis of spatial-temporal samples (e.g., a location and associated time stamp). A spatial-temporal sample can correspond to data that identifies a specific event, user, and/or device at a location at a time. For example, a spatial-temporal sample can include a geographic location and a time stamp corresponding to the geographic location. The geographic location may include location coordinates, such as a latitude and longitude, and possibly measurement uncertainty information indicative of the accuracy of the geographic location.

Determining whether the user has visited any venue can further consider one or more prior venue visits being tracked by the system for the user. As an example, the system may consider the previous venue visit being tracked for the user. Where the system is determining whether there was a current venue visit after determining the user has at least one subsequent venue visit, the system can additionally or instead consider subsequent venue visits tracked for the user. As an example, the system may consider the following venue visit being tracked for the user.

The system can rank the candidate venues by a likelihood that the user has visited a particular candidate venue, where the likelihood with respect to each candidate venue may be quantified using a corresponding confidence score. In implementations where there is a determination as to whether the user has visited any venue, the ranking could potentially only be performed where the system first determines that a venue visit has occurred. As another example, the ranking may occur, but a visited venue may only be selected where it is determined that the user has visited any venue (this may be independent or dependent upon the rankings and/or confidence scores).

In accordance with aspects of the present disclosure, the ranking of the candidate venues is based on semantic information. For example, one or more semantic signals can be used, which are extracted from user and/or venue data collected by the system. The semantic signals can include one or more characteristics of the venue, the users, and/or one or more other users. As noted above, the characteristics can be any combination of explicit and/or inferred characteristics of venues and/or users. Further, the characteristics can be any combination of sporadic and/or routine characteristics. The semantic signals may be fed into a probabilistic model, which generates a confidence score from the semantic signals.

In some cases, the system generates an initial ranking of the candidate venues using the semantic signals. Subsequently, the candidate venues may be re-ranked by optimizing candidate venue rankings across a sequence of venue visits. In particular, each time the system has determined that any venue has likely been visited by the user, a set of ranked candidate venues may be generated and stored for that potential visit. The system can then adjust the rankings for each potential visit to arrive at what the system understands to be a reasonable sequence of visitations for the user and/or users on aggregate (e.g., based on semantic information, which can form the basis of previously tracked visitation patterns and data used in the analysis). Thus, venue visits may be optimized across a whole day, a whole week, any portion of portions thereof, or over other intervals.

Where the user is still active in the venue visit being analyzed, the sequence being optimized may not consider subsequent venue visits. However, in various implementations, subsequent venue visits are considered as part of the sequence optimization. Additionally, in some cases, multiple venue visit sequence optimizations can occur for the same venue visit. For example, a venue visit may be analyzed as part of a sequence prior to the system detecting any subsequent venue visits (e.g., while the visit is ongoing), and again after the system detects at least one subsequent venue visit (e.g., after the visit has concluded). Subsequent analysis for optimization can optionally be independent from any initial optimization.

In various implementations, the system selects a visited venue for a visit based on the ranking of the candidate venues. For example, the highest ranked venue (e.g., having the highest confidence score) may be selected as the visited venue. The visited venue can be selected at any suitable time, such as after the candidate venues are initially ranked, and/or after the rankings are revised at least one time. Further, it is noted that the selected visited venue can optionally be revised, or reselected, for example, after subsequent re-ranking, analysis, and/or optimization of the venue visits. Thus, for example, in some cases, the system may select one of the candidate venues as a venue that the user is currently visiting, and subsequently select a different one of the candidate venues after further analysis when more information is available to the system (e.g., one or more subsequent venue visits are detected, a contradiction with another venue visit or semantic information is identified such as from user feedback on the selected venue, such as explicit feedback).

Further, while the system may include a candidate venue in the candidate venues being considered for a venue visit, the candidate venue may be eliminated or removed from consideration (e.g., the rankings of candidate venues) at any suitable time. For example, during candidate venue ranking or re-ranking (or prior thereto), where the system determines using the semantic information that the candidate venue is sufficiently unlikely to be considered as a possibility for the visited venue.

Additionally, the system may subsequently determine that a venue visit did not occur, regardless of whether the system initially determined that the user visited any venue. This may occur, for example, during candidate venue ranking or re-ranking, where semantic information may indicate that none of the candidate venues are sufficiently likely to be considered as a possibility for the visited venue. In this case, each candidate venue may be eliminated or removed from consideration. Further, during venue visit sequence optimization, the system may determine that the venue visit is sufficiently unlikely to have occurred when considered with respect to the other venue visits being tracked and/or other factors. In these cases, the venue visit may optionally be excluded from future venue visit sequence optimizations (e.g., of the same sequence or subset of the sequence) as a result of such a determination. It will therefore be appreciated from the foregoing that the system's conclusions with respect to venue visits can adapt and be reevaluated and revised as the system obtains additional information and/or performs further analysis.

The ranked candidate venues can be used in various manners, such as to tailor the provision of content for the user. For example, the system can select the highest ranked candidate venue as a visited venue and can provide content to the user based on the selected visited venue. Users may receive assistance or otherwise receive tailored content that is relevant and helpful with respect to the visited venue. The tailored content may be provided while the venue visit is ongoing if the visited venue is determined during the visit. Further, the tailored content may be provided any time after the venue visit is concluded, especially where the visited venue is determined after the venue visit. These and other concepts are contemplated as being within the scope of the present disclosure.

Turning to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes a number of user devices, such as user devices 102a and 102b through 102n; a number of data sources, such as data sources 104a and 104b through 104n; server 106; and network 108. It should be understood that system 100 shown in FIG. 1 is an example of one suitable computing system architecture. Each of the components shown in FIG. 1 may be implemented via any type of computing device, such as computing device 600, later described with reference to FIG. 6, for example. The components may communicate with each other via network 108, which may include, without limitation, one or more local area networks (LANs) and/or wide area networks (WANs). In exemplary implementations, network 108 comprises the Internet and/or a cellular network, amongst any of a variety of possible public and/or private networks.

It should be understood that any number of user devices, servers, and data sources may be employed within system 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of system 100, while server 106 can be on the server-side of system 100. Server 106 can comprise server-side software designed to work in conjunction with client-side software on user devices 102a and 102b through 102n so as to implement any combination of the features and functionalities discussed in the present disclosure. This division of system 100 is provided to illustrate one example of a suitable system, and there is no requirement for each implementation that any combination of server 106 and user devices 102a and 102b through 102n remain as separate entities.

User devices 102a and 102b through 102n might take on a variety of forms, such as a personal computer (PC), a laptop computer, a mobile phone, a smartphone, a smartwatch, a tablet computer, a wearable computer, a personal digital assistant (PDA), an MP3 player, a global positioning system (GPS) device, a video player, a handheld communications device, a workstation, any combination of these delineated devices, or any other suitable device.

Data sources 104a and 104b through 104n can comprise data sources and/or data systems, which are configured to make data available to any of the various constituents of system 100. In some cases, at least one of the data sources is discrete from user devices 102a and 102b through 102n and server 106. However, at least one of the data sources may be incorporated and/or integrated into at least one of those components.

Figure 2:
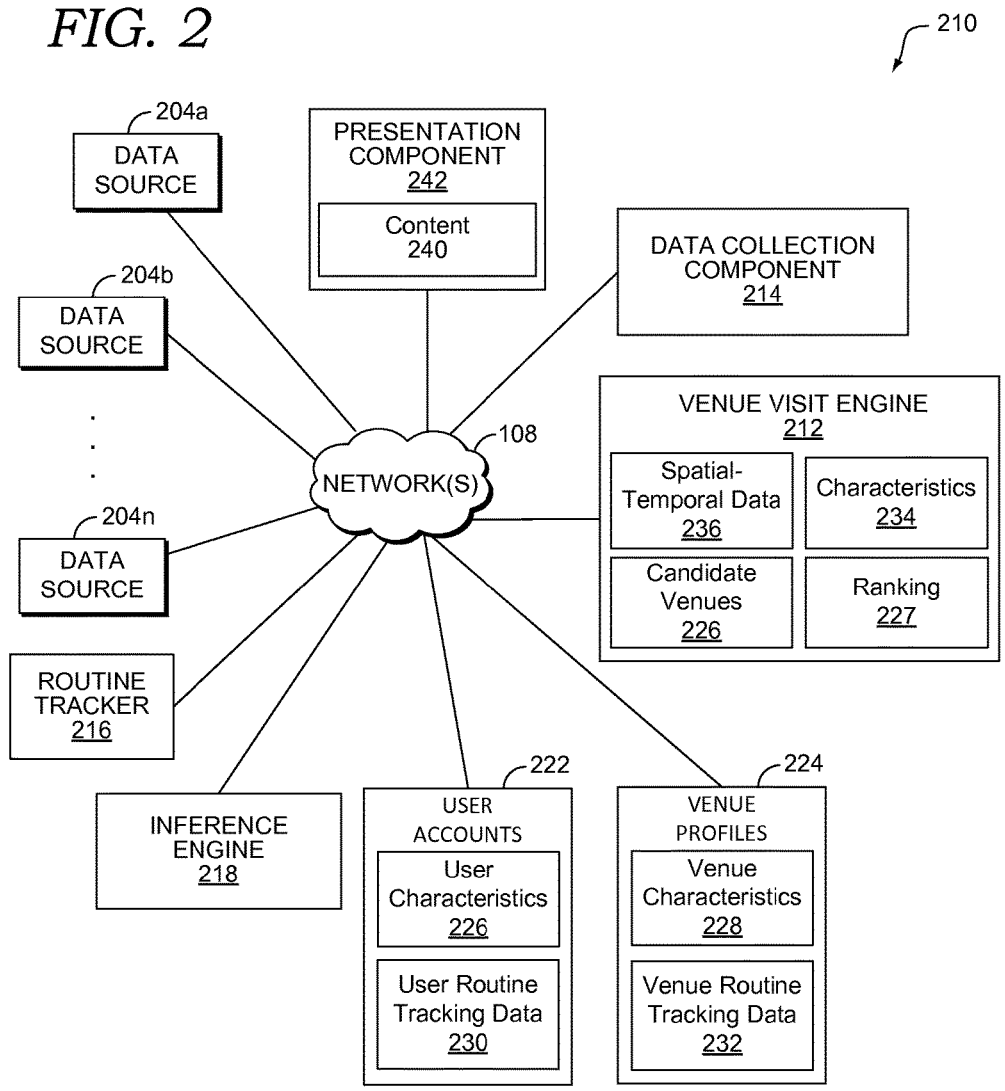
FIG. 2 is a block diagram showing an exemplary routine management environment in accordance with implementations of the present disclosure.

System 100 can be utilized to implement an environment in which visited venues may be detected, identified, tracked, and analyzed with respect to a plurality of users. Referring now to FIG. 2 with FIG. 1, FIG. 2 illustrates exemplary venue inference environment 210 of system 100, in accordance with implementations of the present disclosure.

Venue inference environment 210 includes data collection component 214, which can be employed to facilitate the provision of data to any of the various components in venue inference environment 210, such as venue visit engine 212, routine tracker 216, and inference engine 218. At least some of the data may be accumulated, reformatted and/or combined, and stored in one or more databases, by data collection component 214. Data sources, such as any combination of data sources 204a and 204b through 204n, corresponding to data sources 104a and 104b through 104n in FIG. 1, can provide the data that may be accumulated by data collection component 214.

The data acquired by data collection component 214 can include any combination of user data, venue data, and interpretive data. User data corresponds to data acquired in association with one or more users. As used herein, a user can correspond to a user account, such as one of user accounts 222, which optionally may be associated with one or more of a username, a password, a user device (e.g., a media access control address), an Internet Protocol (IP) address, a universally unique identifier (UUID), and/or other user identifiers. In some cases, user data may not be directly associated with one of user accounts 222, but may be associated with another user account that is known or designated to correspond to the same user. For example, one of user accounts 222 may be linked to one or more other user accounts, which may be in another system or other systems. As examples, the same user could have a Microsoft Account, a Facebook account, a PayPal account, a Google Account, a Twitter account, a bank account, an eBay account, and an Amazon account, each of which may be associated with user data of the user, and semantic information may be extracted therefrom. Venue data corresponds to data collected in association with one or more venues. As used herein, a venue can correspond to a venue profile, such as one of venue profiles 224, which may be associated with a corresponding venue identifier (ID) and optionally various metadata including a name of the venue, a category of the venue, a location or region of the venue, and the like.

Interpretive data corresponds to data utilized by inference engine 218 (e.g., a rule-based inference engine) to supplement the interpretation of information in venue inference environment 210. In this regard, any of the various components in venue inference environment 210 can use inference engine 218 to generate inferences based on the information available to venue inference environment 210, such as semantic information. Interpretive data can be used by inference engine 218 to provide context to the information to support inferences made by inference engine 218. As an example, the information (e.g., user data) could indicate that a user was at a location, whereas interpretative data can comprise weather information utilized by inference engine 218 to infer that the user was not at a baseball stadium at the location due to a snowstorm. The types of inferences capable of being made by inference engine 218 are described throughout the present application.

The data acquired by data collection component 214, including user data, venue data, and interpretative data, can be collected by data collection component 214 from a variety of sources in which the data may be available in a variety of formats. Examples of user or venue data include data derived from one or more sensors, such as sensors providing smartphone data, home-sensor data, global positioning system (GPS) data, vehicle signal data, wearable device data, user device data, gyroscope data, accelerometer data, calendar data, email data, schedule data, credit card usage data, purchase history data, weather data, other sensor data that may be sensed or otherwise detected by a sensor (or detector) component, derived from a sensor component associated with the user or venue (including location, motion, orientation, position, user-access, user-activity, network-access, device-charging, or other data that is capable of being provided by one or more sensor component) and many more.

In some respects, at least some of the data may be provided as input signals to venue inference environment 210. An input signal can correspond to a feed of data from a corresponding source or sensor, such as any of the various sources or sensors described above. A user signal may refer to an input signal that comprises a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Similarly, a venue signal may refer to a feed of venue data from a corresponding data source. For example, a venue signal could be from a thermometer, a Rich Site Summary (RSS) document, a Twitter user, a barometer, a venue website, or other data sources.

The user data, venue data, and interpretive data may be continuously collected over time by a large variety of possible data sources and/or data systems. It is intended that the collection and accumulation of user data and venue data embody robust privacy and data protection for individuals, businesses, and public-sector organizations. In this respect, users, and, in appropriate cases venues, are given control over many aspects related to associated data, including the ability to opt in or opt out of data collection and/or any of the various tracking or analysis features described herein. Furthermore, safeguards are to be implemented to protect sensitive data from access by other parties, including other users, without express consent of the user or account administrator. Additionally, any data that is collected is intended to be made anonymous, whenever possible.

In addition to acquiring the data from the data sources, data collection component 214 can extract semantic information such as explicit and/or inferred characteristics of users and/or venues from any combination of user data, venue data, or other data that may be included in the acquired data. Some extracted characteristics (characteristics of users), such as user characteristics, may be stored in association with one or more user accounts, such as user accounts 222. Further, extracted characteristics (characteristics of venues), such as venue characteristics, may be stored in association with one or more venue profiles, such as venue profiles 224.

As noted above, explicit characteristics correspond to explicit information, which may be explicit from a user, or explicit from a data source (e.g., a web page, document, file, etc.) from which the information is extracted. As an example, explicit information can be extracted from data recording input by a user of likes and dislikes into a user profile associated with one of user accounts 222. As another example, the data could record a like from a "like button" on a social media site, which is provides this information to venue inference environment 210.

As further noted above, deeper understandings of users and venues are available to venue inference environment 210 using inferred characteristics extracted using inference engine 218. Inferred characteristics can be discovered by the system by making inferences from any of the information available to venue inference environment 210. This includes any combination of the user and venue data, as well as previously extracted explicit and/or inferred characteristics of ones or more users (e.g., the user) and/or venues. In some implementations, inferred characteristics can be updated over time as additional information is available to inference engine 218. For example, inference engine 218 may be used to determine that one or more inferred characteristics no longer apply to one or more users and/or venues. This may be, for example, a result of changes in nature of the user and/or venue and/or a result of inference engine 218 having a better understanding of users and/or venues or the world based on the additional information. Where inferred characteristics change, any of the venue visit determinations that were previously made could optionally be reevaluated in response to detecting the change.

In some cases, inference engine 218 can utilize routine tracker 216 to assist in generating its inferences for venue visit engine 212. Routine tracker 216 is configured to identify and track routines of one or more users from user data. A routine may be defined in terms of one or more recurring events that make up the routine. An event can correspond to one or more defined actions, behaviors, and/or activities that correspond to a user or venue and are detectable by routine tracker 216. Examples of events are the user eating at a restaurant, the user eating at a particular restaurant, the user being in a geographic region, the user being at a geographic location, the user attending a meeting, reception of a sensor reading associated with the user, the user going to the gym, and the user being at work, amongst many more possibilities. Another example of an event is the user visiting a venue, such as a particular venue, which may be identified and selected by venue visit engine 212.

The data acquired by data collection component 214 on aggregate forms a detailed record of patterns of events involving users and venues. These patterns can provide understanding and knowledge to inference engine 218 and can be identified and detected by routine tracker 216 as routines of those users or events (e.g., from user, venue, and/or interpretive data). In doing so, routine tracker 216 may be employed with inference engine 218 to infer whether one or more events of a routine have occurred from the data, and to extract inferred characteristics, such as routine characteristics.

As indicated above, patterns of detected events may be utilized at least partially to form the basis any of various inferences described herein by inference engine 218. As an example, the patterns can be employed in identifying that routines correspond to users and/or venues, in extracting characteristics of users and/or venues, mapping or otherwise analyzing potential venue visits to routines of users, and optimizing sequences of potential venue visits (e.g., events).

Exemplary approaches are described below, where each instance of an event has corresponding historical values of tracked variables that form patterns and inference engine 218 may evaluate the distribution of the tracked variables for patterns or divergences therefrom. In the following example, an event has a tracked variable that is a time stamp corresponding to an instance of the event. However, it will be appreciated that, conceptually, the following can be applied to different types of historical values used in generating inferences.

A bag of time stamps (e.g., values of given tracked variables) can be denoted as $\{t_m\}_{m=1}^M$, and mapped to a two-dimensional histogram of hours and days of the week. The two-dimensional histogram can comprise a summation over the instances of the event, such as:

$$h_{ij} = \Sigma_{m=1}^M [\text{dayOfWeek}[t_m]=i] \wedge I[\text{hourOfDay}[t_m]=j].$$

This histogram can be used to determine derivative histograms. For example, a day of the week histogram may correspond to:

$$h_j = \Sigma_i h_{ij},$$

An hour of the day histogram may correspond to:

$$h_i = \Sigma_j h_{ij}.$$

As further examples, one or more histograms may be determined for particular semantic time resolutions in the form of:

$$h_{iC} = \Sigma_{j \in C} h_{ij}.$$

Any of various semantic time resolutions may be employed, such as weekdays and weekends, or morning, afternoon, and night. An example of the latter is where $C \in \{\text{morning, afternoon, night}\}$, morning=$\{9, 10, 11\}$, afternoon=$\{12, 13, 14, 15, 16\}$, and night=$\{21, 22, 23, 24\}$.

An additional data structure utilized in representing an event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the $2^{nd}$ three-week period of available time stamps. $N^{(j)}$ may be utilized to denote the number of j-week time stamps available in the tracked data, for example, $N^{(3)}$ denotes the number of three-week periods available in the time stamps.

Inference engine 218 may generate a confidence score that quantifies a level of certainty that a particular pattern is formed by the historical values in the tracked variable. In the following example, the above principles are applied utilizing Bayesian statistics.

In some implementations, a confidence score can be generated for a corresponding tracked variable that is indexed by a temporal interval of varying resolution. For time stamps, examples include Tuesday at 9 AM, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_i^K (\alpha_0 + h_i)}$$

Where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_{i^*}$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations results in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week, and 3 visits every 2 weeks. Using a Gaussian posterior, a confidence score may be generated for a pattern for every period resolution, denoted as j. This may be accomplished by employing the formula:

$$\overline{\mu^{(j)}} = \lambda \left( \frac{1}{N^{(j)}} \sum_i^{N^{(j)}} w_i^{(j)} \right) + (1-\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \overline{\mu^{(j)}}| < a) = \int_{\mu^{(j)}-a}^{\mu^{(j)}+a} \mathcal{N}(x|\overline{\mu^{(j)}}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., exceeds a threshold value), inference engine 218 generate an inference, such as identify that a routine corresponds to a user or venue and/or other various inferences described herein. As an example, inferences may be made based on whether or not a given event diverges from that pattern. For example, inference engine 218 can determine that a value of a tracked variable, and thus an instance or predicted instance of a corresponding event, diverges from the pattern formed by the historical values of the tracked variable, otherwise the instance may be inferred to be part of or otherwise fit the pattern or routine. In some cases, a divergence may be determined where the value is greater than or equal to approximately one standard deviation from the time stamps of the pattern. In some cases, a divergence may be detected where the value is greater than or equal to approximately two standard deviations from the time stamps of the pattern. The standard deviation may be established by mapping a function to the time stamps of the pattern, such as a Gaussian function, or bell curve, as an example.

As a further example, inference engine 218 may determine that an event of a routine is being practiced by a user where one or more of the confidence scores for one or more tracked variables exceed a threshold value. In this regard, an event of a routine may be determined as being practiced based on routine tracker 216 using inference engine 218 to identify one or more patterns in historical values of one or more tracked variables of the event.

In generating any of the various inferences, inference engine 218 may employ place prediction, which may be implemented using the histogram model indexed using the temporal interval, as described above. Using the current time, the histogram model may be applied to each of the known places. Each place of these places can yield a probability that estimates a portion of visits to the place at the current time:

$$P(\text{Place} = p \mid \text{time} = t) = \frac{P(\text{time} = t \mid \text{Place} = p)P(\text{Place} = p)}{\sum_{p'} P(\text{time} = t \mid \text{Place} = p')P(\text{Place} = p')}.$$

Quantity P(time=t|Place=p) is the histogram model described above. P(Place=p) is the prior probability of being in place p. The resolution of time t is relaxed in from narrow to broad (e.g., Tuesday At 9 AM=>Weekday Morning) until the above quantity surpasses a threshold, in which case our model predicts place p. Where place p corresponds to a geo-location of the user, it may be inferred that the user is visiting some venue and/or a candidate venue corresponding to place p can have an increased confidence as being the particular place the user has visited.

Further, in tracking routines with respect to users, inference engine 218 may employ next place prediction, which may be implemented using the histogram model indexed by a period and a number of time stamps (i.e., samples), as described above. Using this model, the expectation for a visit in a particular week using the previous number of visits can be computed using the formula:

$$P(\text{time} = t \mid \text{Place} = p, \text{Week} = w) =$$

$$\begin{cases} P(\text{time} = t \mid \text{Place} = p) \begin{pmatrix} \# \text{ of visits for week } w - \\ \text{Expected Number Of} \\ \text{Visits for week } w \end{pmatrix} > 0 \\ 0 \qquad \qquad \text{otherwise} \end{cases}$$

The expected number of visits per week is computed using the period with the highest confidence. Where one of the candidate venues for a following potential venue visit corresponds to a predicted next place, the confidence score for that candidate venue can be increased, which may occur as part of optimizing over a sequence of potential venue visits. Further, next place prediction may be employed in determining whether any venue is visited in analyzing a potential venue visit.

Routine tracker 216 can store any of the various data employed in tracking routines of users and venues as user routine tracking data 230 and venue routine tracking data 232 respectively (each can include venue visits, visitation patterns, and/or other information inferred or discovered using venue visit engine 212 in inferring venue visits). Over time, routine tracker 216 may update the routine tracking data as user data and venue data is periodically analyzed and new routines are discovered or old routines are modified or disassociated with users or venues. One or more routine characteristics of users or venues can be extracted from one or more routines using the routine tracking data and inference engine 218. Thus, it will be appreciated that routine characteristics, such as cuisine preferences, movie watching patterns, and the like may also be updated and discovered for users based on data generated by inferring venue visits. In some cases, the routine tracking data includes entries that identify routines and assignments between routines and one or more users and/or venues that are determined to practice the routines. The entries may store or otherwise indicate any of the various data associated with a routine, such as events of the routine and/or values associated with tracked variables of those events.

Tracked variables are event variables that are assigned and/or recorded by routine tracker 216 with respect to a corresponding detected instance of an event. Values corresponding to the tracked variables may be stored in association with a user or venue in the routine tracking data. Tracked variables can correspond to any of a variety of user data or venue data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device) GPS coordinate samples, and many more.

It will be appreciated that values of tracked variables may be associated with one or more events and/or routines and need not be event or routine specific. An example of a tracked variable is a time stamp corresponding to a respective instance of the event, such as a venue visit that may be identified by venue visit engine 212. The time stamp can indicate the relative order or sequence of an instance of an event with respect to other instances of the event, and optionally instances of one or more other events of a corresponding routine.

As a further example, an event may comprise a user arriving at a store. One tracked variable may correspond to an arrival location, such as an arrival location name. In detecting the event, routine tracker 216 may use inference engine 218 to infer the arrival as being satisfied based on user data comprising GPS data on the user's phone (e.g., user device 102a of FIG. 1), wherein the arrival location name is identified as a store and stored based on interpretive data that includes map data used to associate coordinates from the user's phone with a corresponding location name. Thus, for one instance, the arrival location name may be "Walmart," and for another instance, the arrival location name may be "Target," as examples. However, it will be appreciated that the level of granularity in the detection and tracking of events can vary. Thus, as an example, an arrival location name need not be a tracked variable. Furthermore, other examples of potential tracked variables, or more generally event variables, include arrival time (e.g., a time stamp), arrival location coordinates, driving speed, gas mileage, vehicle name, and many more.

Venue visit engine 212 can infer venue visits by users to one or more venues with inference engine 218 using any combination of the information available in venue inference environment 210. In particular, venue visit engine 212 can apply any combination of the semantic information to inference engine 218 to determine which particular venue is visited by a user. Such semantic information comprises any of the various characteristics of users and venues described herein, such as characteristics 234.

In various implementations, venue visit engine 212 employs location data associated with a user (e.g., any of the users corresponding to user accounts 222), such as spatial-temporal data 236, in order to infer venue visits for the user. Venue visit engine 212 can determine a location (e.g., geo-location) of the user using the location data. The location data comprises one or more location samples, which respectively correspond to a location of a user. The location data can be provided in the user data acquired by data collection component 214. In particular, venue visit engine 212 can extract the location data from user data using data collection component 214. Where spatial-temporal data is employed, a location sample can have a corresponding time stamp. The time stamp can indicate at what time the user was at the location that corresponds to the location sample. For example, where the spatial-temporal data is provided by a sensor, such as a GPS receiver, the time stamp may be generated by the sensor, for example, at a time when the location was determined and/or measured by the sensor, along is GPS coordinates. In some cases, the location data can be extracted from one or more user signals to provide a stream of location data to venue visit engine 212.

While a GPS receiver is described, the location data can be extracted by data collection component 214 using any of a variety of approaches for determining a location of a user and optionally a time corresponding to the location. In some implementations, for example, the location data can be generated using a Wi-Fi access point trace and/or a cellular trace. The user may be on user device 102a, which is capable of interacting with signals from the one or more Wi-Fi access points and/or cellular networks. Data collection component 214 may locate the user at least partially based on these interacting signals and generate the location data accordingly, such that venue visit engine 212 can use the location data to locate the user. As an example, the location data can be based on detecting one or more of those networks and could comprise one or more network names and/or network identifiers corresponding to the networks.

Venue visit engine 212 can use the location data to map the networks to a location corresponding to the user or otherwise utilize information resulting from the interacting signals.

Venue visit engine 212 can generate a set of candidate venues based on proximity between the determined location (e.g., geo-location) of the user and the candidate venues. The candidate venues may be selected from the venues corresponding to venue profiles 224 based on the proximity. In some implementations, venue visit engine 212 selects each venue located within a given radius or region of the user location as a candidate venue. The radius used can be determined based upon the accuracy of the location data, such that venue visit engine 212 uses a larger radius or region for less accurate location data. The accuracy of the location data may be determined, for example, based on the source or sources of the data and/or from the location data itself (e.g., based on values thereof). For example, venue visit engine 212 may employ a smaller radius for location data extracted from or using a GPS receiver than for location data based on network tracing absent data from a GPS receiver.

Additionally, one or more venues may be included in the set of candidate venues by using one or more other approaches to candidate venue identification. For example, such a candidate venue may not necessarily have a venue profile in venue profiles 224 associated with a specific location, but instead may be more generic or categorical. Examples include a private residence, a beach, a park, or an office, although other types of venue categories can be employed. These venues may be referred to herein as categorical venues and are distinguished from specific venues. Including one or more categorical venues, in addition to or instead of one or more specific venues offers several potential advantages.

In many cases, using a categorical venue can significantly reduce the number of candidate venues included in the set. For example, if the user is in a neighborhood and specific venues are employed for each private residence, the set could include a large number of additional specific venues. By collapsing multiple specific venues into one or more categorical venues, processing power is saved, as well as storage capacity; particularly in implementations where such venues are need not be specifically tracked. As venue inference environment 210 may be capable of concurrently inferring venue visits of many users, these savings can accumulate rapidly.

As another potential benefit, in some implementations, a categorical venue can be inferred even where venue inference environment 210 has limited information pertaining to the specific venue visited by the user. For example, a categorical venue may be inferred even where the venue does not have a specific venue profile in venue profiles 224, or where a profile exists, but has limited information. Further, in some cases, venue inference environment 210 may not have sufficient semantic information available to confidently infer the user's presence at a specific venue, because of the nature of the venue and/or by choice, such as to respect privacy concerns at a residence.

In some implementations, identification of a categorical venue can be based on at least some of the number of venues near the user, the types of venues near the user, the visit duration of the user, the day of the week of the visit, the time of day of the visit, and/or other factors. For example, where there are few or no specific venues within the proximity of the user, it may be more likely that the user is at a categorical venue (e.g., a private residence). Furthermore, a categorical venue is more likely to be inferred where the visit duration is within a time range corresponding the categorical venue. Duration could be inferred in the aforementioned cluster analysis. As an example, the longer the visit (e.g., greater than a threshold), the more likely the visit is at a private residence. Furthermore, many users are more likely to be home on weekdays after work hours, such as around dinner time. These parameters for these factors can be inferred from tracked user routines specific to the user and/or aggregated tracked user routines. As another option, at least some of the parameters may be explicitly entered into the system.

Venue visit engine 212 can subsequently employ inference engine 218 to use semantic information to infer which of the candidate venues is visited by the user. For example, the inference can be based upon any combination of characteristics (e.g., characteristics 234) of one or more users or venues, such as the user and candidate venues.

In some implementations, venue visit engine 212 determines whether the user has visited any venue (e.g., regardless of the particular venue that is visited). Such a determination may occur before or after selecting the candidate venues. In some cases, venue visit engine 212 first searches for at least one candidate venue as part of determining whether the user has visited any venue. Where no candidate venues are selected (e.g., the set of candidate venues is empty), venue visit engine 212 can determine that no venue visit has have occurred. However, if at least one candidate venue is selected, venue visit engine 212 may proceed with further analysis. For example, venue visit engine 212 may perform an analysis capable of distinguish between whether a venue had been visited or merely passed or walked by.

The determination can be based on one or more locations of the user indicated in the location data (e.g., the geo-location) and the duration the user was at or near the location. This can include using cluster analysis of spatial-temporal samples (e.g., a location sample and associated time stamp). This can further include considering one or more prior venue visits being tracked by the system for the user. As an example, the system may consider the previous venue visit being tracked for the user. Where the system is determining whether there was a current venue visit after determining the user has at least one subsequent venue visit, the system can additionally or instead consider subsequent venue visits tracked for the user. As an example, the system may consider the following venue visit being tracked for the user.

Prior and/or subsequent venue visits can be used, for example, by venue visit engine 212, to attempt to map the venue visit being analyzed to a routine of the user. Where venue visit engine 212 is able to map the venue visit to the routine, it is more likely that a venue visit has occurred. As an example, the user may have a routine of going from home to work every weekday. Leaving home may be one event of the routine, arriving at work may be another event of the routine, and stopping by a coffee shop one the way to work may be yet another event of the routine, as indicated in user routine tracking data 230. Venue visit engine 212 may map the venue visit to the stop by the coffee shop based on the geo-location of the previous venue visit being tracked corresponding to the user's home, and optionally based on a following venue visit being tracked corresponding to the user's work. Venue visit engine 212 may further utilize other information, such as comparing time stamps of the geo-locations to times the user typically performs the visits (i.e., routine characteristics of the user).

By mapping the venue visit to a routine of the user, venue visit engine 212 can have increased confidence in inferring that a venue visit has occurred. For example, a venue visit may be inferred in situations that otherwise might not be possible using location data alone due to various limitations in location data. For example, the location data may have a limited number of location samples, such as a single location sample for a geo-region, may have a low level of accuracy, or may otherwise lead to inconsistent or inconclusive results when analyzed. Thus, clustering analysis may not conclusively identify a venue visit, but by analyzing the semantic information, venue visit engine 212 can still accurately infer the visit likely occurred.

As another example of how prior and/or subsequent venue visits can be used, the system may use the information tracked with respect to prior and/or subsequent venue visits to infer that a routine of the user is or has occurred, as well as other semantic information corresponding to the venue visit being considered. Where venue visit engine 212 is sufficiently confident that the routine is occurring, and venue visit engine 212 is unable to map the venue visit to the routine (e.g., the venue visit would contradict the routine and/or make the routine impossible to complete), venue visit engine 212 may reduce the confidence that a venue is visited accordingly.

Venue visit engine 212 can further rank candidate venues by a likelihood that the user has visited a particular candidate venue. It should be appreciated that as used herein, terms such as confidence and likelihood can be quantified as a score, and any determinations or inferences made based on confidence or likelihood can be based on whether the score exceeds a threshold value. Thus, for example, the likelihood with respect to each candidate venue may be quantified using a corresponding confidence score. In implementations where venue visit engine 212 determines whether the user has visited any venue, the ranking could potentially only be performed where venue visit engine 212 first determines that a venue visit has occurred or is occurring, thereby saving processing power. As another example, the ranking may occur, but a visited venue may only be selected where it is determined that the user has visited any venue.

It will therefore be appreciated that determining whether any venue visit has occurred can be independent or dependent upon the rankings and/or confidence scores depending on the approach employed. An example where the determination is dependent upon or based on the rankings and/or confidence scores is where none of the venue visits are sufficiently likely to have occurred (e.g., none of the confidence scores exceed a threshold value) such that it is inferred that no venue is visited. An example that is independent of the rankings and/or confidence scores is has been described above, although that determination may be made prior to or after generating the rankings.

Venue visit engine 212 can base the ranking of the candidate venues on semantic information, such as characteristics 234. For example, one or more semantic signals can be used, which are extracted from user and/or venue data collected by the system. The semantic signals can include one or more characteristics of the venue, the users, and/or one or more other users. As noted above, the characteristics can be any combination of explicit and/or inferred characteristics of venues and/or users. Further, the characteristics can be any combination of sporadic and/or routine characteristics. The semantic signals may be fed into a probabilistic model, which generates a confidence score from the semantic signals.

The probabilistic models can account for any of a variety of possible parameters that may be supplied by the semantic information. In some implementations, characteristics provided to the probabilistic model are extracted from search history data of one or more users. For example, a user characteristic extracted from the search history of the user can indicate that the user searched for at least one of the venues. Venue visit engine 212 can analyze the strength of associations between user characteristics and candidate venues. Venue visit engine 212 may increase the likelihood that the user visited one or more of the candidate venues that are in the search history based on the user characteristic. In some cases, whether the likelihood is increased for the candidate venue and/or the amount of increase is based upon the time the search was made. Venue visit engine 212 can be configured such that more recent search history results in a further increase than older search history and/or may only analyze or consider search history that was generated sufficiently close to the venue visit.

Thus, for example, if the user had searched two days prior for the name of a restaurant or a type of restaurant (e.g., Italian Food) near Las Vegas. Candidates venues having venue characteristics associated with the user characteristic can have an increased confidence score. In other words, venue visit engine 212 can be more likely to select Italian restaurants near Las Vegas than Chinese restaurants near Las Vegas. Further, where none of the candidate venues are near Law Vegas, no additional weight may be given to any candidate venue using this analysis.

Although search history is described above, it will be appreciated that similar information may be extracted from texts sent and/or received by users, web browsing history of the user, emails sent and/or received by users, social network posts made by users and/or directed to users (or other communication such as messages exchanged between users, picture captions or tags, etc.), appointments made or attempted to be made by or with users in a scheduling application, tweets made by or directed to users, and many more. Further, any such information can be aggregated so as to provide aggregate characteristics that correspond to multiple users.

An example of a type of characteristic of a venue that can impact the confidence score of one or more of the candidate venues corresponds to the operating hours of the candidate venue. This can be an explicit characteristic extracted from a store website, or be inferred from times of aggregate user visits to the venue. It is noted that the inference could additionally factor in the information on the store website. The confidence that the user visited a candidate venue may optionally increase based on determining that the venue visit occurred during the operating hours, and may optionally decrease based on the venue visit being outside of the operating hours.

As another example, a venue characteristic can be based on the peak visit times, or rush hours, for the venue. In some implementations, the peak operating times of the business are inferred from aggregated user data, such as an aggregation of user routine tracking data 230. In addition, or instead, such information can be inferred from aggregated venue visits tracked for multiple users. Peak visit times may further be inferred, for example, based on a candidate venue being categorized as a restaurant, where restaurants are known or determined to have peak hours around breakfast, lunch, and dinner time. A confidence score for a candidate venue may optionally increase based on the venue visit being during the peak or rush hour and optionally decrease based on the visit being outside of the peak or rush hour.

A venue characteristic can also be based on known events associated with the venue that are during or near the venue visit. Examples include deals or sales at the venue, concerts at the venue, and performances at the venue. Such a characteristic can be a routine characteristic, such as one inferred from one or more routines tracked by routine tracker 216, or can be a sporadic characteristic. A confidence score for a candidate venue may optionally increase based on the venue visit being during a known event. Such an increase could optionally be based on venue visit engine 212 inferring an association between the user and the event, such as from semantic information.

In some cases, a user characteristic can be a preference of the user, such as a brand preference, which may be a routine characteristic of the user. In such a case, the user characteristic may be analyzed for an association with a candidate venue and/or venue characteristic thereof. For example, where the characteristic of a user is a brand preference (a user preference), the confidence may increase for one of more candidate venues based the venue having a venue characteristic of carrying or otherwise being associated with the brand. Thus, the system can identify that a user that prefers Microsoft products is more likely to be in a Microsoft Store than an Apple Store. As another example, if the user has a known cuisine type preference, confidence can increase for candidate venues associated with the cuisine type. Such associations can be used to, for example, determine and/or identify a match between the user characteristic of the user and a venue characteristic of a candidate venue, such that the confidence for that candidate venue can be increased accordingly.

A user preference may generally be considered a routine characteristic of a user. However, sporadic characteristics of the user can also be analyzed to determine and/or identify a match between a sporadic characteristic of the user and a venue characteristic of a candidate venue, such that the confidence for that candidate venue can be increased accordingly. As an example, a sporadic characteristic may correspond to a text or email the user sent to his wife telling her he would pick up groceries after work. Data collection component 214 may have extracted the characteristic from a text message log of the user. Based on this sporadic characteristic, the confidence that the user visited candidate venues that carry groceries may be increased (e.g., as indicated by venues characteristics, such as venue categories).

In some implementations, a sporadic characteristic of the user may be inferred or extracted from network access information generated by the user device of the user. For example, network names or other connection information can be extracted from networks discovered by the user device in network scanning and/or networks the user device is connected to. This extracted information can be matched to one or more venue characteristics to increase the confidence that the user is at a particular candidate venue. For example, if one or more of the characters in a network name can be mapped to a known venue name, confidence can increase that the user is visiting that venue, and even further where the user is connected to the network.

Thus, if the user device is connected to "Starbucks Wi-FI" venue visit engine 212 can be more confident the user is visiting Starbucks. Furthermore, the networks are not limited to Wi-Fi and can be other types of detected networks, such a Bluetooth. As an example, if scanning information extracted from the user device includes information from many Bluetooth access points known to correspond to electronic equipment, venue visit engine 212 can be more confident the user is visiting a store that sells electronics. The type of device or particular product could even be inferred from mapping network names to known types of devices or particular products (e.g., Bluetooth speakers, laptops, etc.) and potentially mapped to known information about a candidate venue. As another example, user devices of the user could be associated with one or more other uses devices through the Bluetooth or other signals, such that a selected venue and/or semantic information for inferring venues associated with the other users can be factored into the analysis for the user.

In further implementations, a sporadic characteristic of the user can correspond to one or more applications on the user device of the user that the user that was active, open, and/or being interacted with on the user device prior to, during, and/or after the venue visit. For example, the one or more applications could be mapped to venue characteristics of one or more venues. Venue visit engine 212 can increase the confidence for a candidate venue, for example, where an application is associated with the candidate venue (e.g., in one of the venue profiles). If the user is using a Starbucks application, for example, during the venue visit, or temporally proximate to the venue visit, the user is more likely to be identified as having visited Starbucks. In some cases, the use of the application may be considered. For example, where the user uses the application to order food and/or beverage items from the company associated with the candidate venue, it is more likely the user will visit the candidate venue, or is at the candidate venue. As a further example, if the application is a museum application (or another specific category of application), the user is more likely to be identified as having visited ones of the candidate venues that are museums (or another specific venue category associated with the application category).

Any combination of the aforementioned scenarios, as well as many other possible scenarios based on semantic information can be factored into the rankings generated by the probabilistic model. In some cases, venue visit engine 212 selected one of the candidate venues as the visited venue based on the rankings. Optionally, prior to the selection or possibly after the selection, venue visit engine 212 can use the ranking as an initial ranking of the candidate venues and subsequently re-rank the candidate venues by optimizing candidate venue rankings across a sequence of venue visits.

In particular, each time the venue visit engine 212 has determined that any venue has likely been visited or is likely being visited by the user, a set of ranked candidate venues may be generated and stored for that potential visit. Venue visit engine 212 can then at any suitable time adjust the rankings for each potential visit to arrive at what venue visit engine 212 understands to be a reasonable sequence of visitations for the user and/or users on aggregate (e.g., based on semantic information, which can form the basis of previously tracked visitation patterns and data used in the analysis). Thus, venue visits may be optimized across a whole day, a whole week, any portion of portions thereof, or over other intervals.

Where the user is still active in the visit being analyzed, the sequence being optimized may not consider subsequent venue visits. However, in various implementations, subsequent venue visits are considered as part of the sequence optimization. Additionally, in some cases, multiple venue visit sequence optimizations can occur for the same venue visit. For example, a venue visit may be analyzed as part of a sequence prior to venue visit engine 212 detecting any subsequent venue visits, and again after venue visit engine 212 detects at least one subsequent venue visit. Subsequent analysis for optimization can optionally be independent from any initial optimization.

In optimizing candidate venue rankings across a sequence of venue visits, venue visit engine 212, can base such optimization on pattern information of the various tracked venue visits, such as those indicated in user routine tracking data 230. Such optimization can be inference based and may employ a hidden Markov model, which can be modified to further consider subsequent states in addition to previous states corresponding to venue visits. As another example, such optimization can be based on fuzzy logic algorithms.

To illustrate the foregoing, assume venue visit engine 212 has ranked candidate venues for first and second potential venue visits that are in sequence. Further assume the highest ranked candidate venue for the first potential visit is a movie theater. The ranking of the second potential venue visit also has a movie theater as the highest ranked candidate venue with confidence scores of 0.9 for the movie theater and 0.8 for a coffee shop. The optimization can result in the confidence score of the movie theater in the second potential visit being adjusted down, and/or the confidence score of the coffee shop being adjusted up, such that the coffee shop is re-ranked as the highest ranked candidate venue for the second potential visit. Such an adjustment may be made, for example, where the pattern information that forms the basis of the optimization indicates that users on the aggregate typically do not visit two movie theaters in a row and/or that users on the aggregate typically visit a coffee shop after a movie theater. It is noted that user patterns (e.g., routines) can further be considered and may be favored over user aggregates in at least some cases so as to reflect unique characteristics of the user in the optimization.

As a further example, in some cases, the user having visited a particular venue at least once in the sequence increases the confidence that the same venue, and/or a venue known to be associated with the particular venue was visited at least one other time in the sequence (e.g., within the same day or week). For example, a user that goes to the dry cleaners is more likely to return to pick up clothes later in the day or week. As another example, a user that visits a hospital is more likely to subsequently visit a pharmacy. These multiple visits or visitation groups can be expected by the system and associated with venues, for example, in their venue profile and/or based on aggregated or user visitation patterns. Thus, the appearance of a candidate venue in multiple visits, or a candidate venue and an associated candidate venue in multiple visits can result in confidence increasing for one or both of those venues.

In various implementations, venue visit engine 212 selects a visited venue for a visit based on the ranking of the candidate venues. For example, the highest ranked venue (e.g., having the highest confidence score) may be selected as the visited venue. The visited venue can be selected at any suitable time, such as after the candidate venues are initially ranked, and/or after the rankings are revised at least one time. Further, it is noted that the selected visited venue can optionally be revised, or reselected, for example, after subsequent re-ranking, analysis, and/or optimization of the venue visits. Thus, for example, in some cases, venue visit engine 212 may select one of the candidate venues as a venue that the user is currently visiting, and subsequently select a different one of the candidate venues after further analysis when more information is available to venue visit engine 212 (e.g., one or more subsequent venue visits are detected).

Further, while venue visit engine 212 may include a candidate venue in the candidate venues being considered for a venue visit, the candidate venue may be eliminated or removed from consideration (e.g., the rankings of candidate venues) at any suitable time. For example, during candidate venue ranking or re-ranking, where semantic information may indicate that the candidate venue is sufficiently unlikely to be considered as a possibility for the visited venue.

Additionally, venue visit engine 212 may subsequently determine that a venue visit did not occur, regardless of whether venue visit engine 212 initially determined that the user visited any venue. This may occur, for example, during candidate venue ranking or re-ranking, where semantic information may indicate that none of the candidate venues are sufficiently likely to be considered as a possibility for the visited venue. In this case, each candidate venue may be eliminated or removed from consideration. Further, during venue visit sequence optimization, venue visit engine 212 may determine that the venue visit is sufficiently unlikely to have occurred when considered with respect to the other venue visits being tracked and/or other factors. In these cases, the venue visit may optionally be excluded from future venue visit sequence optimizations (e.g., of the same sequence or subset of the sequence) as a result of such a determination. It will therefore be appreciated from the foregoing that venue visit engine's 212 conclusions of with respect to venue visits can adapt and be reevaluated as venue visit engine 212 obtains additional information and/or performs further analysis.

Having selected one of the candidate venues as a visited venue, content (e.g., content 240) may be presented to the user based the selection of the visited venue. The content may be presented, for example, on any combination of user devices 102*a* and 102*b* through 102*n*. In this capacity, presentation component 242 may employ any of the various data shown with respect to user accounts 222 and venue profiles 224, as well as other data.

Presentation component 242 can determine when and/or how content is presented to a user. Presentation component 242 can further determine what content is provided to the user. In some embodiments, presentation component 242 comprises one or more applications or services operating on a computing device (such as computing device 600 described in FIG. 6 including a user device, such as a mobile computing device) or in the cloud.

Determinations made by presentation component 242 with respect to content to be presented based on the selection of the visited venue can be utilized to assist the user, such as by selecting and providing content to the user based on the content being relevant to the visited venue, or refraining from selecting and providing irrelevant content to the user thereby reducing the utilization of network resources. For example, inferences may be made based on the selection of one or more visited venues, and content can be selected and presented based on those inferences. As a specific example, inference engine 218 may be used to infer that the user likes Italian food because the user has visited many Italian restaurants. Thus, presentation component 242 may favor Italian restaurants in generating recommendations for places the user could have dinner. As another example, presentation component 242 may recommend the visited venue for dinner based on identifying the visited venue in a set of potential venues. Further, presentation component 242 may inform the user as to any promotions or other offers available at the visited venue.

In some cases, determinations made by presentation component 242 with respect to content to be presented based on selection of a visited venue are based on contextual information corresponding to the visit. In some implementations, venue visit engine 212 may generate the contextual information, which may be provided to presentation component 242. Contextual information generally corresponds to information that provides context to the venue visit. Venue visit engine 212 may generate contextual information utilizing interpretive data to infer or otherwise determine the contextual information, at least partially, from user data associated with the user (e.g., user characteristics). Further, the contextual information may be inferred from venue data associated with the visited venue (e.g., venue characteristics). For example, contextual information could indicate that a user is out of town if the user is located in a different country than their residence. Other interpretive data could be used to further distinguish whether the user is on a personal vacation or is on a business trip. Venue visit engine 212 may also generate contextual information utilizing interpretive data to infer or determine the contextual information, at least partially, from user data associated with at least one other user, such as an aggregate of user data. Contextual information can comprise any type of semantic information corresponding to the venue visit, the user and/or the visited venue. Examples include the time of day, whether it is a weekend, weekday, or holiday, weather conditions, and many more.

Contextual information may indicate or otherwise correspond to a cause of or reason for the venue visit. In some cases, generating the contextual information comprises categorizing the venue visit. In particular, venue visit engine 212 may assign one or more predetermined categories to the venue visit. The content that is provided can be tailored to the category that is assigned to the venue visit. An assigned category can correspond to a categorization of a cause of or reason for the venue visit. The assignment may optionally be based on an analysis of the user data (e.g., aggregated user data and/or user data corresponding to the user) and/or interpretive data. Examples of predetermined categories for the nature of the venue visit include running errands, leisure activities, working, eating out, or exercising.

Where the venue visit is part of a tracked routine identified for the venue visit, such a category may in additionally or instead correspond to a categorization for the overall routine. This can be useful, for example, where presentation component 242 is operating in a prediction mode where content is provided to the user based on the visited venue being used to detect and/or identify a routine of the user. The content that is provided can be tailored to the category that is assigned to the routine. Thus, presentation component 242 may provide differing content to the user based on whether the user is running errands, participating in leisure activities, driving to work, or exercising. As another example, presentation component 242 can provide content based on the category for a future instance of a routine. In a particular example, presentation component 242 may infer that the user typically performs leisure activities on Saturdays and offer suggestions for leisure activities occurring on a Saturday. The inference could be at least partially based on the visited venue (e.g., a movie theater, a stadium, a concert venue) being association with a leisure category.

In some cases, generating the contextual information comprises assigning one or more user-specific categories, or categories that are specific to a user (i.e., user-specific), to the venue visit. Furthermore, generating the contextual information can comprise assigning one or more user-general categories, or categories that are general to the user (i.e., user-general, or non-specific to the user), to the divergence. A cause that is specific to a user may be personal to the user. For example, a user may have gone to the store for medicine because the user was sick. A cause that is general to a user may be shared between multiple users. For example, multiple users may have gone to the venue for a concert.

In some cases, venue visit engine 212 may determine whether a cause is user-specific or user-general by analyzing the venue visit with respect to venue visit of one or more other users. For example, venue visit engine 212 may determine that the cause is not shared between multiple users with respect to the same or different corresponding event(s) and/or routine(s) that include the venue visit. Where a cause is shared by one or more users, venue visit engine 212 may determine that the cause is general to the user. As an example, venue visit engine 212 may make the determination based on a number of other users visiting from the same venue (e.g., as part of the same routine). If many other users are visiting from the same venue, it may be more likely that a cause of a given user's visit is general to the user. Thus, a cause may be categorized as user-general based at least in part on the number of other users exceeding a threshold value.

In determining whether a cause is user-specific or user-general, or otherwise generating contextual information and/or categorizations for the venue visit by a user, other users may be considered based on one or more identified similarities to the user (i.e., a subset of users). For example, venue visit engine 212 may select, or group, users by one or more shared characteristics (e.g., a shared user characteristic). One example of a shared characteristic is a shared geographical region. For example, each user may be considered by venue visit engine 212 based on being from the same city, state, country, or continent as the user. As another example, a shared characteristic may comprise shared demographic information. Examples include a shared gender, age, age range, income level, race, and/or ethnicity.

Venue visit engine 212 may identify one or more shared characteristics from data associated with one or more of user accounts 222, such as profile data of multiple users. In addition, or instead, a shared characteristic may be based on one or more values of one or more tracked variables of one or more events. For example, a tracked variable could be a blood sugar level of a user (e.g., extracted from sensor data). Venue visit engine 212 may select users based on identified similarities in blood sugar levels. The similarities may be on the aggregate for data accumulated with respect to the users (e.g., an average value over all accumulated values), or could be based on one or more particular instances, or groups of instances, such as one or more instances associated with a venue visit.

Other examples of contextual information are confidence scores, variance scores, and other information generated in identifying and selecting the venue visit and/or the visited venue. A further example is an online or offline mode indicator for the venue visit. An offline mode indicates a state in which venue visit engine 212 has determined that the venue was visited in the past. In contrast, online mode corresponds to a state in which venue visit engine 212 has determined that the user is presently visiting the venue and/or is actively participating in an instance of a tracked routine that includes the visit to the venue. As an example, a limited time offer that is active at the venue may be presented to the user in online mode, whereas the offer may not be presented to the user in offline mode. The manner and type of content provided by presentation component 242 may depend on the mode. As an example, a limited time offer that is active at the venue may be presented to the user for an online mode, whereas the offer may not be presented to the user for an offline mode.

In some cases, presentation component 242 may provide content to a user based on an the identification and/or selection of the venue visit, an identified tracked routine corresponding to the venue visit, and/or contextual information corresponding to the venue visit. For example, if contextual information indicates that the user is on vacation in Scotland, the content provided to the user may provide information about the country, leisure activities available in the area, and the like. This content would not be presented, for example, if the contextual information indicated the user was in Canada, or at work. Where contextual information comprises one or more categories, at least some of the content provided to the user may be associated (e.g., pre-associated) with a category assigned to the venue visit. Thus, different categories may have at least some different associated content for presentation, and the content that is provided to the user may depend upon which category or categories have been assigned to the venue visit.

In some cases, content that is generated based on the venue visit may be new content that is generated and/or presented based on the identifying of the venue visit and/or selection of the visited venue. For example, assume that Ben is identified as visiting a baseball stadium. Based on the identified venue visit, content is presented to Ben suggesting that a reservation be made at a nearby restaurant for after the game. The content may comprise generated content (e.g., generated based on the identifying) comprising one or more specific restaurants, such as fast food restaurants. At least some of the content may be presented and selected based on being relevant to a tracked routine that corresponds to the venue visit (e.g., contextual information of the venue visit). For example, a recommended restaurant may one that Ben often visits after baseball games based on patterns of tracked detected events.

In embodiments, the content comprises one or more suggestions, recommendations, or relevant information based on the identified venue visit. For example, in one embodiment, upon determining that a user did not arrive at his office by a certain time (e.g., 10:00 AM) in the morning but instead visited the pharmacy (e.g., the user is sick), content may be generated including a suggestion that the user send cancellation emails for meetings scheduled that day and/or a prompt asking the user if he would like to automatically reschedule the meetings. Additional content may be generated and provided to the user including a prompt asking if the user would like to schedule an appointment with a doctor, and/or information regarding television programs likely to be of interest to the user for watching while sick at home.

As another example, using embodiments of the invention it may be determined that a particular user plays golf every Tuesday evening as a routine (e.g., visits the golf course every Tuesday). Thus, content may be generated and presented to the user prior to an upcoming predicted visit to the gold course including one or more of (a) a suggestion for scheduling a tee time on Tuesday, based on the user's schedule, user routine information, information from sources associated with the golf course (such as a website for the golf course), and/or other user information such as calendar information; (b) a prompt asking the user if the user would like driving directions to the golf course or to send out appointments to schedule the tee time with other users known to attend the golf course in association with the user; (c) additional information that may be relevant to an upcoming golf game based on the contextual information, such as green fees on the dates and times of the potential golf game.

In addition, or instead, presentation component 242 may refrain from presenting content to the user based on an identified venue visit. For example, content may sometimes be presented based on venue visit engine 212 determining a user practices a routine, which may not be presented based on the venue visit diverging from the routine. The content may have otherwise been presented absent the identification of the visited venue, and thus not presented, due to the identification. For example, presentation component 242 may typically present the content to the user based on an indication that the user practices the routine without an indication that the user is diverging from the routine.

To illustrate the foregoing, in the above example, based on identifying a routine of Ben, presentation component 242 may typically present content to Ben comprising a recommended place for Ben to eat, on a periodic basis, such as each day before his lunch at 1 PM (e.g., corresponding to a predicated instance of an event and/or routine). However, based on venue visit engine 212 identifying that Ben visited a popular restaurant for lunch at 12 PM, presentation component 242 may refrain from presenting the content corresponding to the recommendation.

Where presentation component 242 refrains from presenting the content to a user, processing, power, and other resources related to the presentation of the content are conserved. Furthermore, in cases where refraining from presenting the content to the user includes refraining from generating at least some of the content based on an identified venue visit and/or contextual information corresponding to the venue visit, resources are further conserved. For example, generating content may utilize network bandwidth, processing power, and energy. It is further noted that using the contextual information can reduce the quantity of information searched by focusing the search and avoiding various on-the-fly computations while providing more useful content to the user.

Furthermore, presentation component 242 may modify content presented to the user, or the presentation thereof, based on an identified venue visit and/or contextual information corresponding to the identified visit. In the example above regarding recommending a restaurant at the baseball stadium, an example of a modification of the content would be where the restaurant that is recommended is based on the venue visit. In some cases, presentation component 242 may reduce the likelihood that a venue is recommended for dinner based identifying that the user ate at that restaurant the previous day. This may result in a different restaurant being recommended that may otherwise have be recommended to the user, but for the identified venue visit.

In some implementations, venue visit engine 212 selects or generates one or more recommended actions for presentation component 242 in the presenting of the content to the user. A recommended action corresponds to data that presentation component 242 can utilize in determining various aspects of the presenting of content to the user. A recommended action may correspond to one or more courses of action for responding to the venue visit. For example, a recommended action may specify whether a presentation component should automatically modify user content or should request information from the user, such as a user confirmation.

A recommended action may specify or designate one or more content, one or more static and/or dynamic content fields (e.g., in a content card), one or more content cards, a time, a place or location, a screen or menu, an environment, a mode or manner of user interaction, or other factors that may be incorporated into conditions or instructions with respect to an action. Presentation component 242 may choose or select to follow one or more conditions and/or instructions associated with or corresponding to a recommended action for presenting content to the user.

As examples, a recommended action may indicate to presentation component 242 (or another application or service), and/or be utilized by presentation component 242 to determine, any combination of when to present content to a user (e.g., using a specified time or time range); how to present content to the user; what content to present to the user; when to modify; generate, or select content to be presented to the user; when to refrain from presenting content to the user; when to seek user feedback with respect to content; and many more.

In some embodiments, recommended actions may correspond to one or more conditions, which may be assessed based on sensor(s) on a user device associated with the user, via user history, patterns or routines (e.g., the user drives to work every day between 8:00 and 8:30 AM), other user information (such as online activity of a user, user communication information including missed communications, urgency or staleness of the content (e.g., the content should be presented to the user in the morning but is no longer relevant after 10 AM), the particular user routine that the venue visit is a part of, and/or contextual information corresponding to the venue visit. For example, where the user is likely driving a car between 8:00 and 8:30 AM, content recommended to be presented to the user during this time may be audibly presented to the user while the user is driving. As another example, content regarding a suggestion to use an offer at the visited venue may be presented where the user opens an application associated with that venue (e.g., while the user is visiting the venue). The content may be presented as a pop-up notification, highlighted message, an icon or symbol in a notifications menu, a text, email, other communication or similar means.

Where a recommended action is with respect to one or more content templates, or content cards, the recommended action may specify one or more content cards. For example, a recommended action may be to present one or more content cards to the user, refrain from presenting one or more content cards to a user, or when to present one or more content cards to the user. Furthermore, the recommended action may specify one or more dynamic and/or static content fields with respect to an action associated with content of the fields.

In some cases, venue visit engine 212 generates one or more recommended actions based on the generated contextual information. For example, a recommended action may be based on a categorization of the venue visit and/or routine corresponding to the venue visit. Thus, one recommended action may be selected or generated by venue visit engine 212 based on the venue visit being assigned a user-specific category, and another recommended action may be selected or generated by venue visit engine 212 based on the venue visit being assigned a user-general category. As another example, at least one recommended action may be generated based on a confidence score utilized in identifying the venue visit. For example, a recommended action may be selected or generated based on the confidence score exceeding or not exceeding a threshold value.

As described above, in some implementations, presentation component 242 can follow one or more recommended actions provided by venue visit engine 212. In some cases, presentation component 242 may determine whether to follow one or more of the recommended actions. As an example, a recommended action could be to request information from the user. Presentation component 242 may request the information from the user based on the recommended action. Presentation component 242, or another application, or service running on a user device, may determine or select, to follow one or more recommended actions and may determine or select to ignore, or not follow, one or more other recommended actions. For example, one or more recommended actions may be ignored, or not followed, based on one or more criteria, such as, the presentation component already having access to information, determining that the user is away from the device or is unlikely to respond to a recommended action, determining that the recommended action no longer applies or is no longer relevant, presentation component 242 having another suitable, or preferred action, and/or other determinations, or inferences, which are based on user data (e.g., user device data), venue data, and/or interpretive data.

Furthermore, in some implementations, presentation component 242 may select to modify one or more recommended actions and to follow one or more of the modified recommended actions. In addition, or instead, presentation component 242 may select or generate one or more actions for presenting content to the user based on a venue visit without regard to a recommended action. These actions and recommended actions may be determined in similar or different manners from one another, and may consider similar information.

In some cases, instances of presentation component 242 are incorporated into one or more services (e.g., applications, processes, programs, threads, etc.), which may be running on a user device, and/or a different system than any combination of the various constituents of venue inference environment 210. As an example, one or more services may receive any combination of information generated and/or stored by venue inference environment 210, which may be incorporated into the routine tracking data.

Examples include one or more confidence scores, contextual information, semantic information, user or venue characteristics, recommended actions, tracked variable variance scores, and more. A service could be running on a user device and may receive such information from a server. As another example, the service could be running on a server in a different system than servers providing such information. As a further example, the information could be received from one or more other services running on the same device (e.g., a user device) as the service. For example, one to all of the various components of FIG. 2 could be incorporated into the same device, which in some cases may be beneficial for security, privacy, and/or other reasons.

In some cases, one to all of the information may be pushed to the service from a server, for example, based on a subscription to the information. As another option, one to all of the information could be queried for by the service. As an example, the information could be stored in one or more entries in a database corresponding to the routine tracking data, or other data. The service, such as an application, may query that information for use by presentation component 242.

Thus, it will be appreciated that, in some cases, venue visit engine 212 and/or other constituents of venue inference environment 210 may be provided to applications or services as a cloud service. In this regard, applications on user devices may optionally incorporate an application programming interface (API) for communicating with the cloud service and for providing at least some functionality of presentation component 242. In this way, a common framework may be provided to applications for tailoring content to users based on divergences from their routines.

Figure 3:
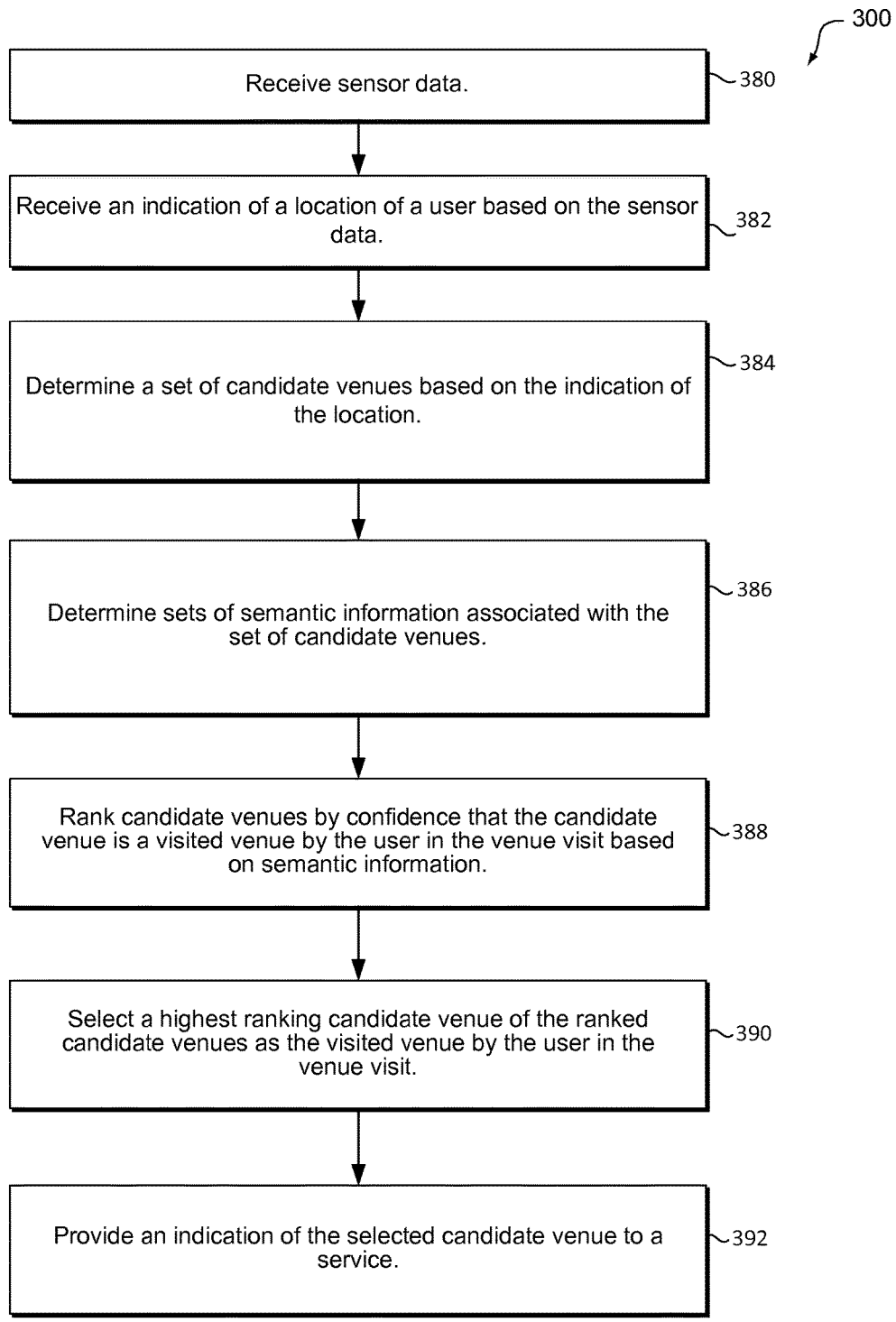
FIG. 3 is a flow diagram showing a method for inferring venue visits using semantic information in accordance with implementations of the present disclosure.

Referring now to FIG. 3, a flow diagram is provided showing an embodiment of a method 300 for inferring venue visits based on semantic information. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 380, method 300 includes receiving sensor data. For example, sensor data from one or more sensors can be received by data collection component 214. In some implementations the sensor is received over one or more network communications, for example, at a server. The sensor data can be received from one or more data sources, which can include a user device (e.g., user device 102a). For example, at least one of the one or more network communications could be from a user device.

At block 382, method 300 includes receiving an indication of a location of a user based on the sensor data. For example, venue visit engine 212 may determine a location associated with a user based at least in part on spatial-location data corresponding to the sensor data. The spatial-location data may be from the user device associated with the user.

At block 384, method 300 includes determining a set of candidate venues based on the indication of the location. For example, venue visit engine 212 may determine candidate venues 226 associated with the location, where candidate venues 226 are determined based at least in part on the indication of the location.

At block 386, method 300 includes determining sets of semantic information associated with the set of candidate venues. For example, venue visit engine 212 can determine sets of semantic information associated with candidate venues 226. Each set can be associated with a respective candidate venue in candidate venues 226. The semantic information can be determined based at least in part on the sensor data. For example, the semantic information can be extracted from the sensor data by data collection component 214. The semantic information can comprise venue characteristics, which may be included in characteristics 234.

At block 388, method 300 includes ranking candidate venues by confidence that the candidate venue is a visited venue by the user in the venue visit based on semantic information. For example, venue visit engine 212 can rank at least some of candidate venues 226 by a confidence that a given candidate venue is a visited venue of a venue visit by the user based at least in part on venue characteristics of characteristics 234 associated with the given candidate venue and additional semantic information associated with the user, such as user characteristics of characteristics 234. The additional semantic information can be determined based at least in part on the sensor data.

At block 390, method 300 includes selecting a highest ranking candidate venue of the ranked candidate venues as the visited venue by the user in the venue visit. For example, venue visit engine 212 can select the highest ranked candidate venue as the visited venue of the venue visit. The selected visited venue can have an associated venue ID and metadata stored in venue profiles 224.

At block 392, method 300 includes providing an indication of the selected candidate venue to a service. For example, venue visit engine 212 can provide, to a service associated with user device 102a, second one or more network communications comprising an indication of the selected visited venue, the indication causing content to be presented to the user on the user device based on the selected visited venue. As an example, the service may be associated with presentation component 242. In some cases, the service is located on user device 102a, and/or another user device associated with the user. Further, the indication may be provided using one or more network communications to the user devices. The indication can comprise, as examples, any combination of a venue ID, metadata stored in association with the venue ID, such as a venue name, one or more recommended actions, a venue category or category for the venue visit, and contextual information generated based on the venue visit.

Figure 4:
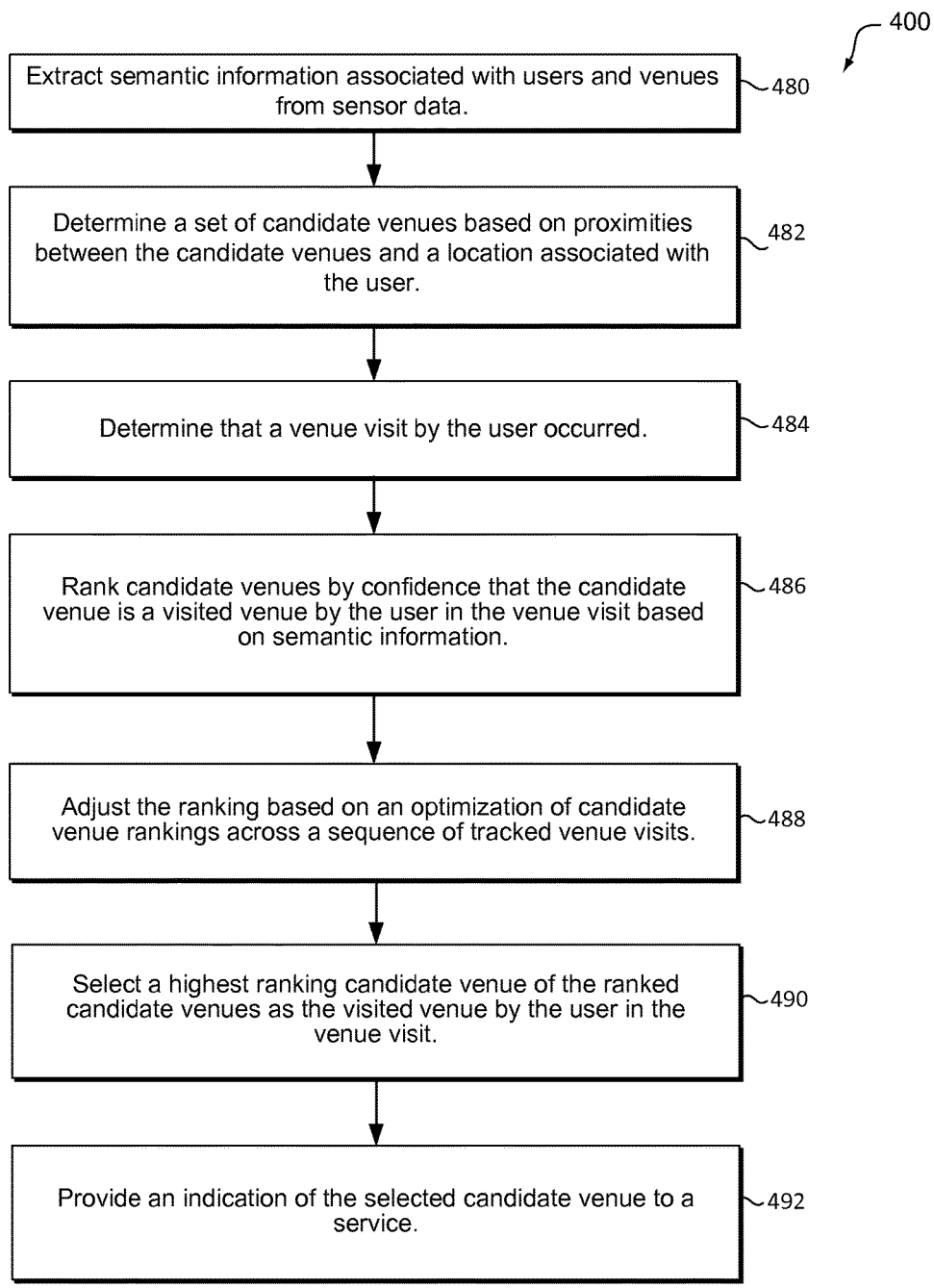
FIG. 4 is a flow diagram showing a method for inferring venue visits using semantic information in accordance with implementations of the present disclosure.

Referring now to FIG. 4, a flow diagram is provided showing one embodiment of a method 400 for inferring venue visits based on semantic information. At block 480, method 400 includes extracting semantic information associated with users and venues from sensor data. For example, data collection component 214 may extract semantic information comprising characteristics of users and venues from the sensor data, where each characteristic is associated with a corresponding one of the users or a corresponding one of the venues. The users can correspond to user accounts 222 and the venues can correspond to venue profiles 224.

At block 482, method 400 includes determining a set of candidate venues based on proximities between the candidate venues and a location associated with the user. For example, venue visit engine 212 may determine a set of candidate venues based on proximities between the candidate venues and a location associated with to a user. The set of candidate venues can be candidate venues 226 in FIG. 2. Further, candidate venues 226 may be selected from venues corresponding to venue profiles 224, at least based on venue visit engine 212 determining that the candidate venues are located within a given radius of the location association with the user.

At block 484, method 400 includes determining that a venue visit by the user occurred. For example, venue visit engine 212 can determine that a venue visit by the user occurred based on an analysis of spatial-temporal data in the sensor data that corresponds to one or more locations associated with the user. The spatial-temporal data correspond to spatial-temporal data 236 in FIG. 2. In some cases, such an analysis can comprise a cluster analysis of spatial-temporal samples generated by user device 102a which is associated with the user. Further, one or more previous and/or following tracked venue visits can be considered in making the determination.

At block 486, method 400 includes ranking candidate venues by confidence that the candidate venue is a visited venue by the user in the venue visit based on semantic information. For example, venue visit engine 212 may rank, based on determining that the venue visit by the user occurred, at least some of the set of candidate venues, the ranking of each candidate venue quantifying a confidence that the candidate venue is a visited venue of the venue visit by the user and being based at least in part on one or more user characteristics of the characteristics of users that are associated with the user and one or more venue characteristics of the characteristics of venues that are associated with the candidate venue. The ranking can be of candidate venues 226 and can correspond to ranking 227 comprising candidate scores for each ranked candidate venue.

At block 488, method 400 includes adjusting the ranking based on an optimization of candidate venue rankings across a sequence of tracked venue visits. For example, venue visit engine 212 can adjusting the ranking of the at least some of the set of candidate venues based on an optimization of candidate venue rankings across a sequence of tracked venue visits, each of the tracked venue visits having corresponding rankings of candidate venues, the optimization being based on visitation patterns identified in the extracted semantic information. The optimization may only consider preceding venue visits, for example, while the user is still visiting the venue. However, subsequent venue visits can optionally be considered after being detected by venue visit engine 212.

At block 490, method 400 includes selecting a highest ranking candidate venue of the ranked candidate venues as the visited venue by the user in the venue visit. For example, venue visit engine 212 can select the highest ranked candidate venue as the visited venue of the venue visit. The selected visited venue can have an associated venue ID and metadata stored in venue profiles 224.

At block 492, method 400 includes providing an indication of the selected candidate venue to a service. For example, venue visit engine 212 can provide, to a service associated with user device 102a, second one or more network communications comprising an indication of the selected visited venue, the indication causing content to be presented to the user on the user device based on the selected visited venue. As an example, the service may be associated with presentation component 242. In some cases, the service is located on user device 102a, and/or another user device associated with the user. Further, the indication may be provided using one or more network communications to the user devices. The indication can comprise, as examples, any combination of a venue ID, metadata stored in association with the venue ID, such as a venue name, one or more recommended actions, a venue category or category for the venue visit, and contextual information generated based on the venue visit.

Figure 5:
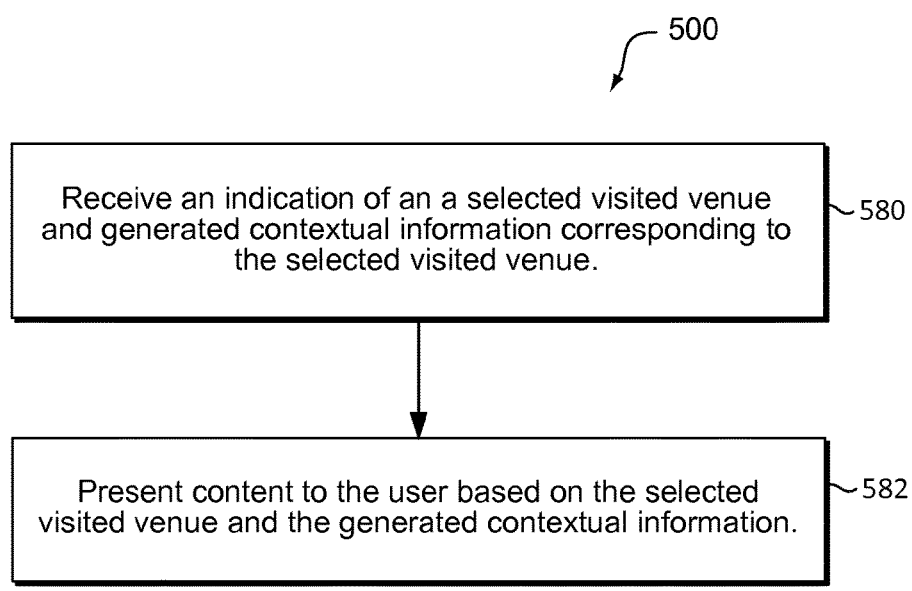
FIG. 5 is a flow diagram showing a method for presenting content to users based on inferring venue visits using semantic information in accordance with implementations of the present disclosure.

Referring now to FIG. 5, a flow diagram is provided showing a method 500 for presenting content to users based on inferring venue visits based on semantic information. At block 580, method 500 includes receiving an indication of a selected visited venue and generated contextual information corresponding to the selected visited venue. For example, the indication can be received from venue visit engine 212 by a service on user device 102a association with the user. Further, the generated contextual information can correspond to any of the various contextual information described herein and may have been generated based on semantic information, such as characteristics 234, used by venue visit engine 212 to select the visited venue.

At block 582, method 500 includes presenting content to the user based on the selected visited venue and the generated contextual information. For example, the service may present or cause to be presented (e.g., using presentation component 242) content (e.g., content 240) that is generated and/or modified based on the indication. Further, the service may refrain from presenting or causing to present (e.g., using presentation component 242) content based on the indication. Thus, content can be tailored to the venue visit by the user.

Figure 6:
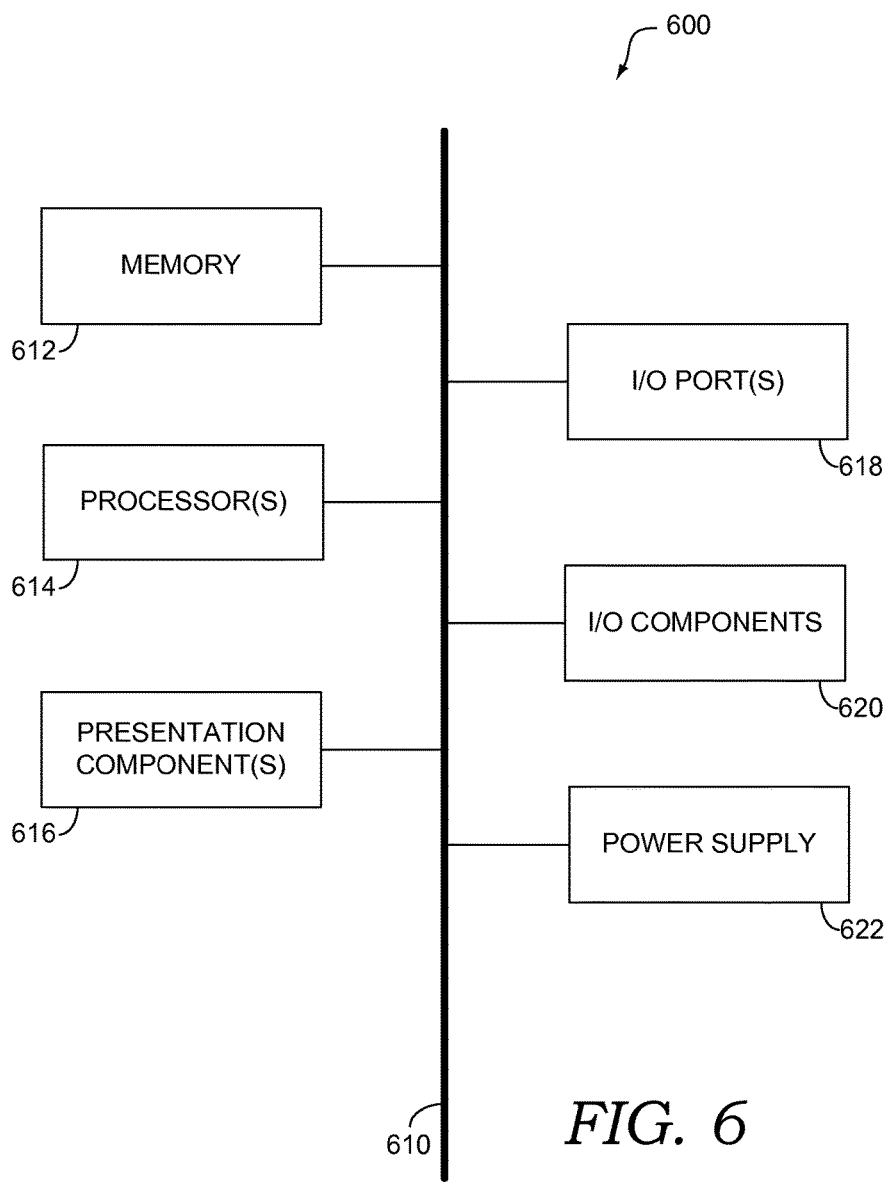
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, implementations of the present disclosure provide for inferring venue visits based on semantic information. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
one or more sensors configured to provide sensor data;
one or more processors; and
one or more computer storage media storing computer-useable instructions that, when executed by the one or more processors, cause the one or more processors to perform operations comprising:
    extracting semantic information comprising characteristics of one or more users and characteristics of one or more venues from the sensor data, each characteristic associated with a corresponding one of the users or a corresponding one of the venues;
    determining a set of candidate venues based on proximities between respective candidate venues and a location associated with a first user;
    inferring that a venue visit by the first user occurred based on
        an analysis of spatial-temporal data from the sensor data that corresponds to one or more locations associated with the first user,
        the extracted semantic information, and
        a particular pattern formed by historical values of a tracked variable;
    based on the inferring that the venue visit by the first user occurred, generating respective confidence scores for each candidate venue of the set of candidate venues using a probabilistic model that is fed the tracked variable, wherein the tracked variable includes at least one or more user characteristics of the extracted characteristics of users that are associated with the first user and one or more venue characteristics of the extracted characteristics of venues that are associated with the respective candidate venue, wherein each respective confidence score quantifies a confidence that the respective candidate venue is a visited venue of the venue visit by the first user;
    ranking the set of candidate venues by their respective confidence scores;
    selecting a highest ranked candidate venue of the set of candidate venues as the visited venue for the venue visit using the ranking;
    after the selecting the highest ranked candidate venue, using a state-based probabilistic model to perform an optimization of the ranked set of candidate venues across a sequence of tracked venue visits corresponding to a known routine, each of the tracked venue visits in the sequence having corresponding ranked candidate venues, the optimization comprising reducing the respective confidence score of a particular candidate venue of the set of candidate venues based on a highest ranked candidate venue for a different venue visit in the sequence having a same venue type as the particular candidate venue;
    adjusting the ranking of at least some of the set of candidate venues based on the reduced respective confidence score;
    selecting a new highest ranked candidate venue of the set of candidate venues as the visited venue for the venue visit using the adjusted ranking; and
    providing, to a service, an indication of the selected visited venue that corresponds to the new highest ranked candidate venue, the indication causing content to be presented to the first user based on the selected new highest ranked visited venue.

2. The computerized system of claim 1, wherein the sensor data comprises location samples of a mobile device associated with the first user, and the proximities are determined with respect to the location of the first user that is inferred from the location samples.

3. The computerized system of claim 1, wherein in the generating respective confidence scores, the confidence for a respective candidate venue increases based on matching the one or more user characteristics associated with the first user to the one or more venue characteristics associated with the respective candidate venue.

4. The computerized system of claim 1, wherein the sequence of tracked venue visits includes at least one venue visit prior to the venue visit and at least one venue visit subsequent the venue visit.

5. The computerized system of claim 1, wherein the known routine has been tracked with respect to the first user over multiple instances of the routine.

6. The computerized system of claim 1, wherein a user characteristic of the one or more user characteristics corresponds to the first user using an application, and the confidence for a respective candidate venue is increased based on a venue characteristic of the one or more venue characteristics associating the application with the respective candidate venue.

7. The computerized system of claim 1, wherein the one or more user characteristics are inferred from a search history associated with the first user or web browsing history associated with the first user.

8. The computerized system of claim 1, wherein at least one candidate venue in the set of candidate venues is a categorical venue and at least another candidate venue in the set of candidate venues is a specific venue.

9. The computerized system of claim 1, wherein one of the one or more venue characteristics corresponds to an event associated with a respective candidate venue and the confidence for the respective candidate venue increases based on determining that the venue visit corresponds to the event at the respective candidate venue.

10. The computerized system of claim 1, wherein the inferring that the venue visit by the first user has occurred is based on at least a prior tracked venue visit, and at least one subsequent tracked venue visit.

11. A computerized method comprising:
receiving, by one or more processors, sensor data from one or more sensors;
determining, by the one or more processors, an indication of a location, the location being associated with a user and determined based at least in part on the sensor data;
determining, by the one or more processors and from a particular pattern formed by historical values of a tracked variable, a set of candidate venues associated with the location;
extracting, by the one or more processors and based at least in part on the sensor data, sets of semantic information associated with the set of candidate venues, each set being associated with a respective candidate venue in the set of candidate venues, the sets of semantic information comprising characteristics of one or more users and characteristics of one or more venues;
inferring, by the one or more processors, that a venue visit by the user occurred based on an analysis of spatial-temporal data from the sensor data that corresponds to one or more locations associated with the user
the extracted sets of semantic information, and
the particular pattern formed by historical values of the tracked variable:
generating, by the one or more processors, respective confidence scores for each candidate venue of the set of candidate venues using a probabilistic model that is fed the tracked variable, wherein the tracked variable includes at least one or more user characteristics of the extracted characteristics of users that are associated with the user and one or more venue characteristics of the extracted characteristics of venues that are associated with the respective candidate venue, wherein each respective confidence score quantifies a confidence that the respective candidate venue is a visited venue of the venue visit by the user;
ranking, by the one or more processors, at least some of the set of candidate venues by their respective confidence score;
using a state-based probabilistic model, by the one or more processors, to perform an optimization of the ranked set of candidate venues across a sequence of tracked venue visits corresponding to a known routine, each of the tracked venue visits in the sequence having corresponding ranked candidate venues, the optimization comprising reducing the respective confidence score of a particular candidate venue of the set of candidate venues based on a highest ranked candidate venue for a different venue visit in the sequence having a same venue type as the particular candidate venue;
adjusting, by the one or more processors, the ranking of at least some of the set of candidate venues based on the reduced respective confidence score;
selecting, by the one or more processors, a new highest ranked candidate venue as the visited venue of the venue visit using the adjusted ranking; and
providing, by the one or more processors and to a service, an indication of the selected visited venue that corresponds to the new highest ranked candidate venue, the indication causing content to be presented to the user based on the selected new highest ranked visited venue.

12. The computerized method of claim 11, wherein the sensor data comprises location samples of a mobile device associated with the user, and the indication of the location is determined based at least in part on the location samples.

13. The computerized method of claim 11, further comprising determining, by the one or more processors, venue pattern information from the sensor data, at least some of the semantic information in the sets of semantic information being inferred from the venue pattern information.

14. The computerized method of claim 11, further comprising determining, by the one or more processors, user pattern information from the sensor data, at least some of the semantic information being inferred from the user pattern information.

15. The computerized method of claim 11, wherein the confidence for the given candidate venue is increased based on matching one or more user characteristics in the semantic information associated with the user to one or more venue characteristics in the semantic information associated with the given candidate venue.

16. A computerized method comprising:
receiving, at a server, first one or more network communications comprising sensor data from one or more sensors;

determining, by the server, a location associated with a user based at least in part on the sensor data;

determining, by the server and from a particular pattern formed by historical values of a tracked variable, a set of candidate venues associated with the location;

extracting, by the server and based at least in part on the sensor data, sets of semantic information associated with the set of candidate venues, each set being associated with a respective candidate venue in the set of candidate venues, the sets of semantic information comprising characteristics of one or more users and characteristics of one or more venues;

inferring, by the server, that a venue visit by the user occurred based on
 an analysis of spatial-temporal data from the sensor data that corresponds to one or more locations associated with the user
 the extracted sets of semantic information, and
 the particular pattern formed by historical values of the tracked variable;

generating, by the server, respective confidence scores for each candidate venue of the set of candidate venues using a probabilistic model that is fed the tracked variable, wherein the tracked variable includes at least one or more user characteristics of the extracted characteristics of users that are associated with the user and one or more venue characteristics of the extracted characteristics of venues that are associated with the respective candidate venue, wherein each respective confidence score quantifies a confidence that the respective candidate venue is a visited venue of the venue visit by the user;

ranking, by the server, at least some of the set of candidate venues by their respective confidence score;

using a state-based probabilistic model, by the server, to perform an optimization of the ranked set of candidate venues across a sequence of tracked venue visits corresponding to a known routine, each of the tracked venue visits in the sequence having corresponding ranked candidate venues, the optimization comprising reducing the respective confidence score of a particular candidate venue of the set of candidate venues based on a highest ranked candidate venue for a different venue visit in the sequence having a same venue type as the particular candidate venue;

adjusting, by the server the ranking of at least some of the set of candidate venues based on the reduced respective confidence score;

selecting, by the server, a new highest ranked candidate venue as the visited venue of the venue visit using the adjusted ranking; and providing, by the server and to a service associated with a user device, second one or more network communications comprising an indication of the selected visited venue that corresponds to the new highest ranked candidate venue, the indication causing content to be presented to the user on the user device based on the selected new highest ranked visited venue.

17. The computerized method of claim 16, wherein the service is an application on the user device and wherein the indication is received by the service on the user device.

18. The computerized method of claim 16, wherein the semantic information associated with the user is extracted from data generated corresponding to at least one of a search history generated at least partially by the user device, a text message sent or received by the user device, and an email sent or received by the user device.

19. The computerized method of claim 16, wherein at least some of the semantic information associated with the given candidate venue is inferred from portions of the sensor data generated by a plurality of user devices.

* * * * *